(12) United States Patent
Liu et al.

(10) Patent No.: US 10,843,956 B2
(45) Date of Patent: Nov. 24, 2020

(54) LASER PROCESSING OF TRANSPARENT ARTICLE USING MULTIPLE FOCI

(71) Applicant: Corning Incorporated, Corning, NY (US)

(72) Inventors: Anping Liu, Horseheads, NY (US); Leonard Thomas Masters, Painted Post, NY (US); Alexander Mikhailovich Streltsov, Corning, NY (US)

(73) Assignee: Corning Incorporated, Corning, NY (US)

( * ) Notice: Subject to any disclaimer, the term of this patent is extended or adjusted under 35 U.S.C. 154(b) by 289 days.

(21) Appl. No.: 15/525,383

(22) PCT Filed: Nov. 6, 2015

(86) PCT No.: PCT/US2015/059448
§ 371 (c)(1),
(2) Date: May 9, 2017

(87) PCT Pub. No.: WO2016/077171
PCT Pub. Date: May 19, 2016

(65) Prior Publication Data
US 2019/0135678 A1    May 9, 2019

Related U.S. Application Data

(60) Provisional application No. 62/077,451, filed on Nov. 10, 2014.

(51) Int. Cl.
*C03B 33/02* (2006.01)
*B23K 26/06* (2014.01)
(Continued)

(52) U.S. Cl.
CPC ...... *C03B 33/0222* (2013.01); *B23K 26/0617* (2013.01); *B23K 26/53* (2015.10); *B23K 2103/54* (2018.08)

(58) Field of Classification Search
None
See application file for complete search history.

(56) References Cited

U.S. PATENT DOCUMENTS

| 4,914,270 | A |   | 4/1990 | Copley et al. |
| 5,386,221 | A | * | 1/1995 | Allen ................. B23K 26/04 347/239 |

(Continued)

FOREIGN PATENT DOCUMENTS

| JP | 2007061825 A | 3/2007 |
| JP | 2013227175 A | 11/2013 |

(Continued)

OTHER PUBLICATIONS

International Search Report and Written Opinion of the International Searching Authority; PCT/US2015/059448; dated May 19, 2016; 18 pages; European Patent Office.

(Continued)

*Primary Examiner* — Ibrahime A Abraham
*Assistant Examiner* — Gyounghyun Bae
(74) *Attorney, Agent, or Firm* — Michael A. Hood; Svetlana Z. Short

(57) ABSTRACT

Disclosed herein are transparent articles and methods and systems for processing transparent articles. Systems for processing transparent articles, e.g. cutting glass, may include at least one initial laser and at least one polarizing beam splitter, where the polarizing beam splitter is configured to split an initial laser beam into a plurality of laser beams, and wherein the plurality of laser beams are useful for processing transparent articles. Methods for processing (Continued)

transparent articles comprise creating at least one flaw in the transparent articles with a plurality of laser beams.

13 Claims, 8 Drawing Sheets

(51) Int. Cl.
*B23K 26/53* (2014.01)
*B23K 103/00* (2006.01)

(56) References Cited

U.S. PATENT DOCUMENTS

| | | | |
|---|---|---|---|
| 5,559,341 A | 9/1996 | Kraninski et al. | |
| 6,322,958 B1 | 11/2001 | Hayashi | |
| 6,472,295 B1* | 10/2002 | Morris | B23K 26/0736 |
| | | | 438/463 |
| 6,576,870 B2* | 6/2003 | Wu | B23K 26/10 |
| | | | 219/121.67 |
| 6,698,354 B2* | 3/2004 | Juffinger | B41B 19/00 |
| | | | 101/395 |
| 6,857,365 B2* | 2/2005 | Juffinger | B41C 1/05 |
| | | | 101/401.1 |
| 7,223,937 B2 | 5/2007 | Nagai et al. | |
| 7,423,237 B2 | 9/2008 | Kusama et al. | |
| 8,158,493 B2* | 4/2012 | Shah | B23K 26/38 |
| | | | 438/463 |
| 8,327,666 B2 | 12/2012 | Harvey et al. | |
| 9,296,066 B2* | 3/2016 | Hosseini | B23K 26/0604 |
| 9,828,278 B2* | 11/2017 | Zhang | B23K 26/0604 |
| 2004/0191645 A1* | 9/2004 | Taniguchi | B23K 26/0613 |
| | | | 430/5 |
| 2005/0006361 A1 | 1/2005 | Kobayashi et al. | |
| 2005/0247683 A1* | 11/2005 | Agarwal | B23K 26/0604 |
| | | | 219/121.73 |
| 2006/0096426 A1* | 5/2006 | Park | B23K 26/032 |
| | | | 83/13 |
| 2006/0108338 A1 | 5/2006 | Nishiwaki et al. | |
| 2006/0289410 A1* | 12/2006 | Morita | B23K 26/03 |
| | | | 219/121.67 |
| 2008/0018943 A1 | 1/2008 | Eyal et al. | |
| 2010/0025387 A1* | 2/2010 | Arai | B28D 5/00 |
| | | | 219/121.69 |
| 2015/0367442 A1* | 12/2015 | Bovatsek | C03B 33/0222 |
| | | | 65/112 |
| 2016/0054522 A1* | 2/2016 | Osellame | G02B 6/105 |
| | | | 65/392 |
| 2016/0158880 A1* | 6/2016 | Koitzsch | B23K 26/046 |

FOREIGN PATENT DOCUMENTS

| | | |
|---|---|---|
| JP | 2013245121 A | 12/2013 |
| JP | 2013245122 A | 12/2013 |
| JP | 2013249228 A | 12/2013 |
| JP | 2014024699 A | 2/2014 |
| KR | 862552 B1 | 10/2008 |
| KR | 1120471 B1 | 3/2012 |
| KR | 2014020776 A | 2/2014 |

OTHER PUBLICATIONS

English Translation of CN201580072821.9 First Office Aciton dated Jul. 23, 2018, China Patent Office.
Japanese Patent Application No. 2017525030; Machine Translation of the Office Action dated Nov. 27, 2019; Japan Patent Office; 6 Pgs.

* cited by examiner

LASER PROCESSING OF TRANSPARENT ARTICLE USING MULTIPLE FOCI

This application claims the benefit of priority to International Application No. PCT/US2015/059448, filed on Nov. 6, 2015, which claims the benefit of priority to U.S. Application No. 62/077,451, filed on Nov. 10, 2014, the content of each of which is incorporated herein by reference in its entirety.

FIELD OF THE DISCLOSURE

The disclosure relates generally to methods and systems for processing transparent materials, such as glass.

BACKGROUND

Many applications require glass that has been strengthened, for example in consumer and commercial electronic devices such as LCD and LED displays, computer monitors, automated teller machines (ATMs) and the like. Sheet glass parts for use in such devices are often cut from larger pieces using mechanical scoring tools or lasers. These rough-cut parts typically go through additional grinding and polishing processes to meet specific requirements, such as particular dimensional tolerances and/or edge shapes. These processes are not only slow and labor intensive, but also are not well suited for strengthened glass in particular.

Various processes may be used to strengthen the glass, including chemical tempering, thermal tempering, and lamination. For example, in an ion exchange strengthening process, ions in the surface layer of the glass are replaced by, or exchanged with, larger ions in a bath solution (such as a salt bath) having the same valence or oxidation state. Lamination mechanical glass strengthening is a mechanism whereby a plurality of layers of glass having different coefficients of thermal expansion (CTE) are bonded or laminated. For example, in a laminate of three layers, i.e. a core layer surrounded by two clad layers, the relatively higher CTE of the core glass layer compared to the CTE of the clad glass layers causes the core glass layer to contract or shrink more than the clad glass layers upon cooling following thermal bonding. This causes the core glass layer to be in a state of tension and the clad glass layers to be in state of compression. The compressive stresses in the clad glass layers inhibit fracture formation and fracture propagation in the clad glass layers, thereby strengthening the glass laminate compared to clad glass that is not under compressive stresses.

Lasers can be used to process various types of strengthened and non-strengthened glasses. In various laser processing methods and systems, multiple scribe lines can be created to achieve the desired smooth and uniform division of a piece of glass. The multiple scribe lines can be achieved by repeating a movement of the laser head and the glass structure relative to one another, which adds time and cost to the manufacturing process.

Accordingly, it would be advantageous to provide methods and systems for cutting transparent materials, for example strengthened glass, that provide improved precision and/or accuracy, while also saving time and being cost-effective. To reduce manufacturing costs and/or processing times, it would additionally be advantageous to provide systems and methods that may function, at least in part, in conjunction with existing systems for cutting glass structures.

SUMMARY

The disclosure relates, in various embodiments, to systems for processing transparent material, the systems comprising (i) a laser emitter configured to generate an initial laser beam, (ii) a first polarization beam splitter configured to split the initial laser beam into a first laser beam directed along a first path and a second laser beam directed along a second path divergent from the first path, wherein the first laser beam includes a first focus point along the first path and the second laser beam includes a second focus point along the second path; and (iii) a second polarization beam splitter configured to receive the first and second laser beams and configured to direct the first and second laser beams through a mutual focusing lens, wherein the first laser beam is configured to generate a first series of flaws in the transparent material at a first lateral position of the transparent material and at a first depth in the surface of the transparent material, wherein the second laser beam is configured to generate a second series of flaws in the transparent material at a second lateral position of the transparent material and at a second depth in the surface of the transparent material, and wherein the first and second series of flaws promote separation of the transparent material into more than one portion along the first and second series of flaws. In various embodiments, the systems may comprise a first set of lenses disposed along the second path and configured to receive the second laser beam, wherein a distance between the first set of lenses establishes a position of the second focus point along the second path, and/or at least two second lenses configured to receive the initial laser beam, wherein adjusting a distance between the first set of lenses changes a focal point of at least one of the first and second laser beams. In addition, at least one mirror may be configured to reflect the second laser beam, wherein adjusting an angle of the mirror changes a distance between the first lateral position and the second lateral position of the focal points corresponding to the first and second laser beams, respectively.

The disclosure also relates, in various embodiments, to methods for processing transparent materials, the methods comprising (i) collinearly converging a first laser beam and a second laser beam along a mutual path, wherein the first laser beam has a first focus point along the mutual path and the second laser beam has a second focus point along the mutual path, and the first focus point and the second focus point are offset from one other, (ii) initially moving the collinearly converged first and second laser beams across a portion of a surface of the transparent material, wherein a first series of flaws are formed in the transparent material at a first depth in the surface of the transparent material corresponding to the first focus point and a second depth in the surface of the transparent material corresponding to the second focus point, (iii) adjusting at least one of the first focus point and the second focus point, and (iv) subsequently moving the collinearly converged first and second laser beams across the portion of the surface of the transparent material, wherein a second series of flaws are formed in the transparent material at a third depth in the surface of the transparent material corresponding to the first focus point and at a fourth depth in the surface of the transparent material corresponding to the second focus point, and wherein the first series of flaws are interleaved with the second series of flaws.

The disclosure also relates, in various embodiments, to methods for processing transparent materials, the methods comprising (i) generating with a laser an initial laser beam configured to project along a first path, (ii) splitting the initial laser beam using a polarizing beam splitter disposed in the first path, wherein a first laser beam is directed along the first path and a second laser beam is directed along a second path divergent from the first path, and wherein the first laser beam has a first focus point along the first path and the second laser beam has a second focus point along the second path; (iii) passing the first and second laser beams through a mutual focusing lens, wherein the mutual focusing lens focuses the first and second laser beams on the transparent material; and (iv) moving the first and second laser beams across a surface of the transparent material to form a first and second series of flaws in the transparent material respectively, wherein the first series of flaws are formed at a first lateral position of the transparent material and at a first depth in the surface of the transparent material, wherein the second series of flaws are formed at a second lateral position of the transparent material offset from the first lateral position and at a second depth in the surface of the transparent material offset from the first depth, and wherein the first lateral position and the first depth corresponds to the first focus point, and the second lateral position and the second depth corresponds to the second focus point.

Further methods comprise a step of separating the transparent material into a plurality of portions along the first and second series of flaws.

Additional features and advantages of the disclosure will be set forth in the detailed description which follows, and in part will be readily apparent to those skilled in the art from that description or recognized by practicing the methods as described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the disclosure.

BRIEF DESCRIPTION OF THE DRAWINGS

The following detailed description can be best understood when read in conjunction with the following drawings, where like structures are indicated with like reference numerals and in which.

DETAILED DESCRIPTION

Figure 1:
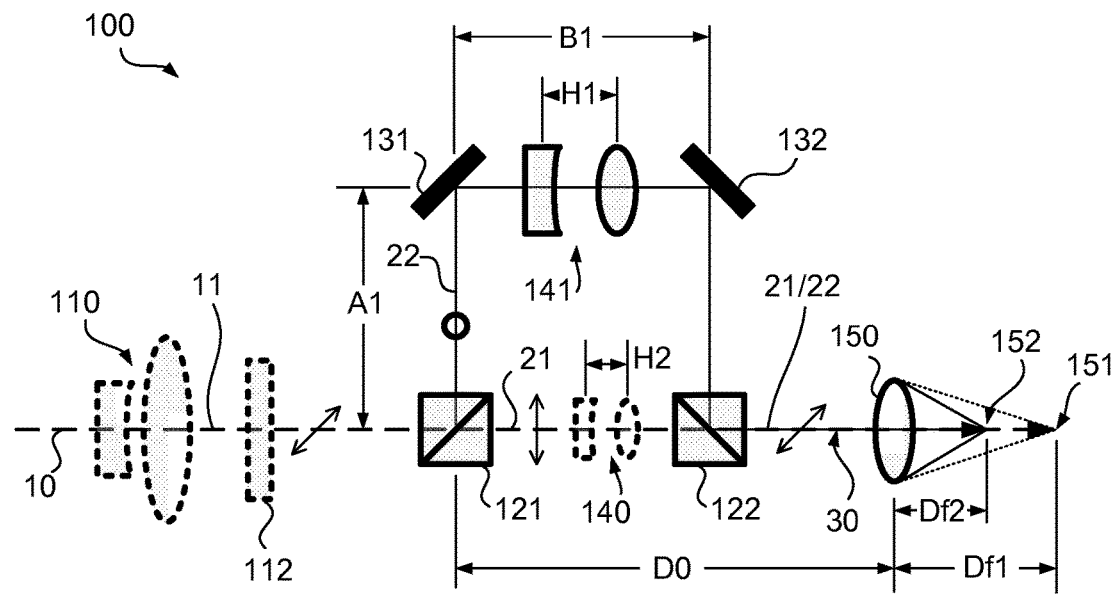
FIG. 1 is a schematic plan view of an exemplary optical arrangement for a multiple foci laser beam according to an embodiment of the disclosure.

Disclosed herein are methods and systems for processing transparent materials. The systems may include optical arrangements comprising a laser emitter and at least two polarizing beam splitters. The laser emitter may generate an initial laser beam. A first polarization beam splitter of the two polarizing beam splitters may be configured to split the initial laser beam into a first laser beam directed along a first path and a second laser beam directed along a second path divergent from the first path. The first laser beam includes a first focus point along the first path and the second laser beam includes a second focus point along the second path. A second polarization beam splitter of the two polarizing beam splitters may be configured to receive the first and second laser beams and configured to direct the first and second laser beams through a mutual focusing lens. The first laser beam may be configured to generate a first series of flaws in the transparent material at a first depth below a surface thereof. In addition, the second laser beam may be configured to generate a second series of flaws in the transparent material at a second depth below a surface thereof. In this way, the first and second series of flaws may encourage separation of the transparent material into more than one portion, along the first and second series of flaws.

As used herein, the term "laser" refers to a device that utilizes the natural oscillations of atoms or molecules between energy levels for generating a beam of coherent electromagnetic radiation, referred to herein as a laser beam, usually in the ultraviolet, visible, or infrared regions of the spectrum. In accordance with various embodiments, an initial laser beam may be split (i.e., separated) into a plurality of laser beams.

As used herein, the term "collinearly converging" refers to more than one laser beam coming together to occupy or pass through the same straight line.

As used herein, the term "focus point" and variants thereof refer to a point at which rays (as of light, heat, or sound) converge or from which they diverge or appear to diverge. This includes, for example, the point where the geometrical boundaries or their prolongations conforming to the rays diverging from or converging toward another point intersect and give rise to an image or grouping of rays after reflection by a mirror or refraction by a lens or optical arrangement.

As used herein, the term "optical train" and variations thereof is intended to mean a series of optical components through which a laser beam may travel.

As used herein, the term "transparent article" as used herein refers to a particular item or object, through which a laser beam may pass. In particular, a transparent article may be brittle, including, but is not limited to, glass, ceramics, glass-ceramics, crystalline materials, polymers, and combinations thereof. Glass embodiments for which the methods described herein may be useful include, but are not limited to, glass sheets and glass structures, and in particular strengthened glass (e.g., chemically strengthened and/or laminated glass). It should be noted that, for ease of reference only, embodiments may be described with regard to glass, but should be understood to be equally useful for other transparent materials.

As used herein, the term "moving" with regard to the laser beams relative to a surface of transparent material that is being processed, is intended to include moving either the laser beams or the transparent material, or both, relative to each other. Thus, the phrase "moving the first and second laser beams across a surface of the transparent material forming a first and second series of flaws in the transparent material" includes embodiments where the laser beams are moved but the transparent material remains stationary, embodiments where the transparent material is moved but the laser remains stationary, and embodiments where both the transparent material and the laser are moved.

As used herein, the term "flaw" and variations thereof is meant to include a defect in or damage to the physical structure or form of a transparent article. A "series of flaws" as used herein refers to a plurality of flaws located one after the other in or on a transparent article. A consecutive and continuous series of flaws may form a line (i.e., a long narrow mark), which may be straight and/or curved. Flaws may be formed on the surface of an article as well as in the bulk of the article (i.e., below the surface).

As used herein, the term "scribe line" and variations thereof is meant to refer to a line that is made by scoring or cutting a surface of an article, such as a glass sheet. According to various embodiments, a scribe line may be formed below the top surface of an article, such as in the bulk of a transparent article. According to various embodiments described, a scribe line is made by laser processing. A scribe line may, according to various embodiments, be a substantially continuous line, or may comprise a series of discontinuous flaws.

Laser processing has become widely adopted within the glass industry to replace mechanical processing and provide unique attributes to processed glass. Laser processing is of particular use for strengthened glass, where traditional mechanical scribe and break methods may fail to achieve smooth and uniform separation. In traditional laser processing systems for glass, the laser power is concentrated in a small region immediately surrounding a single focus point of the laser beam. This will create a flaw at that small region, if the power density is greater than the bulk damage threshold of the processed glass. As the laser beam focus and the transparent article are moved relative to each other (either the laser head moves relative to the transparent article or vice versa), the flaw will form a scribe line, which may be a straight line or other shape corresponding to the motion.

A variety of laser separation techniques for both strengthened and non-strengthened glasses may be used to achieve high edge strength and/or good edge quality. The processes use either creating cracks/flaws and propagating the cracks (i.e., a crack propagation method) via laser induced thermal stress, via chemical bond breaking, the combination of two mechanisms (thermal stress and chemical bond breaking), or ablation to remove or partially remove glass material (i.e., an ablation method). The crack propagation method may achieve relatively high cutting speeds (e.g., >300 mm/s) with a desirable edge quality and strength, but may not be useful to achieve all desirable edge shapes, such as bull nose or chamfer. In contrast, the ablation method may remove a tiny portion of glass with very high precision and therefore can achieve specific edge shapes, but is relatively slow (e.g., cutting speeds of less than 50 mm/s).

According to various embodiments, exemplary methods and systems comprise a single laser beam having a plurality of foci. Such embodiments may enable a plurality of flaws or scribe lines to be created with a single pass of a laser head. Non-limiting embodiments may include an optical system with polarization beam splitters and variable optical lenses to achieve beam splitting and/or manipulation. In this way, a single laser beam may be manipulated into having multiple foci therein. Each of the multiple foci may be capable of forming flaws in the glass, such as a variety of scribing lines and/or patterns for separating the glass into a plurality of portions, leaving a cut edge with a predetermined shape or profile.

For example, a laser beam from a pulsed laser, with pulse durations ranging from a picoseconds to a tens of nanoseconds, at a wavelength range of 200 nm to 1600 nm, may be split into a plurality of beams, each capable of forming a flaw or scribe line in hard laminate glass, as well as other glass types, such as but not limited to Eagle XG®, Gorilla® Glass, and Willow® Glass (all registered trademarks of Corning Incorporated, Corning, N.Y. for glass products).

Typically, power requirements needed to form a flaw or scribe line in glass may be relatively low as compared to the full power available in many laser systems which, in some applications, may provide more than 5-10 times the needed power. Accordingly, various embodiments described herein may take advantage of, rather than waste, the excess power supplied by conventional lasers by splitting a single high power laser beam into a plurality of lower power laser beams, each configured with enough energy to create scribe lines in some of the hardest types of glass.

A typical laser beam emits radiation at a given wavelength, with a transverse intensity profile $I(r)$ of a Gaussian nature, which may be expressed in accordance with Equation (1):

$$I(r) = I_0 \exp\left(-\frac{2r^2}{\omega_0^2}\right) \quad \text{Equation (1)}$$

where:
$I_0$=Intensity at the center of a laser beam at its waist;
exp=an exponential function $e^x$;
r=radius from a central maximum; and
$\omega_0$=Gaussian beam minimum radius (i.e., at its waist).

Using a set of lenses, a Gaussian beam may be focused to a small spot associated with a focus point. The focus point will be a distance Df from the set of lenses, which corresponds to a point along the beam's path associated with the beam's waist. When a piece of glass is placed at that small spot, if the energy from the beam exceeds a bulk damage threshold of the transparent article, a flaw will be generated. In this way, if the focus point is coincident with a surface of a transparent article, a surface damage threshold may need to be exceeded to generate a flaw. Otherwise, if the focus point is below the surface of the transparent article, the bulk damage threshold of that region of the transparent article coincident with the focus point needs to be exceeded to generate a flaw. The size of the flaw will depend on the size of the spot and how much the beam at the focus point exceeds the bulk damage threshold. The distance Df from the set of lenses may be expressed in accordance with Equation (2):

$$Df = \frac{f}{1+\left(\frac{\lambda f}{\pi \omega_0^2}\right)^2} \quad \text{Equation (2)}$$

where:
f=the effective focal length of the lens;
λ=wavelength; and
π=pi~3.14156.
For a compound lens consisting of two lenses, its effective focal length f=f1*f2/(f1+f2−H1), where f1 and f2 are the effective focal lengths of each the two lenses; H1 is the distance between the two lenses. In this way, the effective focal length for compound lenses may be varied by changing the lens spacing H1 between lenses.

However, a half angle of the beam divergence may be expressed in accordance with Equation (3):

$$\theta = \frac{\lambda}{\pi \omega_0} \quad \text{Equation (3)}$$

Thus, Equation (2) may be rewritten in accordance with Equation (4):

$$Df = \frac{f}{1+\theta\left(\frac{\lambda f^2}{\pi \omega_0^3}\right)} \quad \text{Equation (4)}$$

In this way, Equation (4) demonstrates that the distance Df at which the minimum spot size occurs is dependent on the divergence of the beam. Accordingly, by changing the divergence of the beam, the distance Df may also be changed.

In accordance with one exemplary embodiment, the divergence of a beam may be changed by placing two complementary lenses in the beam path that act together to slightly modify the Gaussian beam's divergence as it travels through the optical train. As the lenses are moved closer to or further from each other, the divergence changes and consequently the distance Df at which the minimum spot size occurs may be changed relative to a focal length of a focusing lens.

FIG. 1 illustrates a non-limiting embodiment of an exemplary optical arrangement 100 for various methods described herein; however, various other configurations are envisioned and are intended to fall within the scope of the disclosure, including but not limited to optical trains of different orientations, configurations, sizes, and number, as well as different numbers of optical trains. The optical arrangement 100 includes two separate optical trains that include a series of lenses, beam splitters, and mirrors used to initially separate and later recombine an initial laser beam 10. Once the initial laser beam 10 is separated into a plurality of beams, a focus of at least one of the plurality of beams may be changed in accordance with Equations 1-4, described above. Thus, when the plurality of beams are recombined, they will act like a single beam having a plurality of foci.

The initial laser beam 10 may be, by way of example, a general collimated beam produced by a laser, such as an ultraviolet laser capable of outputting a laser beam with wavelengths from 200 nm to 1600 nm. The initial laser beam 10 may optionally be modified prior to being directed into the optical train. For example, the initial laser beam 10 may be optionally directed through a first set of general lenses 110 that may provide an adjustable telescoping arrangement. For example, the first set of general lenses 110 may include at least two lenses to expand or contract the initial beam to generate the adjusted laser beam 11 with a desired diameter. Otherwise, without the first set of general lenses 110, the adjusted laser beam 11 would be the same as the initial laser beam 10. The adjusted laser beam 11 may optionally be configured to have a linear polarization, but with a mixed and/or arbitrary initial polarization angle. The adjusted laser beam 11 may be directed into a first polarizing beam splitter 121. The first polarizing beam splitter 121 will split the incident light from the adjusted laser beam 11 into two portions with orthogonal polarizations, namely a first laser beam 21 and a second laser beam 22. In addition, the internal angle of the first polarizing beam splitter 121 will impart polarization angles in the first laser beam 21 and the second laser beam 22 that are different from the adjusted laser beam 11, but orthogonal (at right angles) to one another.

For example, if the adjusted laser beam 11 had a linear polarization at 45° (represented as a diagonal line with double-arrow heads) and the first polarizing beam splitter 121 includes an internal reflective layer at a 45° angle, the first laser beam 21 may have a linear polarization at 90° (represented as a vertical line with double-arrow heads), while the second laser beam 22 may have a linear polarization at 0° (represented as a small circle, reflecting a direction in and out of the page). A direction of the first laser beam 21 may continue in the same direction as the adjusted laser beam 11, while the second laser beam 22 is reflected along a second path orthogonal to the first path. In this way, according to various embodiments, the second laser beam 22 may be directed through a separate optical train than the first laser beam 21.

In various embodiments, the separate optical train may include a first mirror 131, a second mirror 132, and a first set of lenses 141. The separate optical train may have a first distance A1 measured between the first polarization beam splitter 121 and the first mirror. The second laser beam 22 may be reflected in the first mirror 131 into the first set of lenses 141. The first set of lenses 141 may, for example, be specifically matched to one another and configured a certain lens spacing H1 apart from one another to generate a specific divergence. For example, a concave lens with a −100 mm focal length may be spaced from a convex lens with a +100 mm focal length the lens spacing H1. The specific divergence may be used to impart a different focus point to the second laser beam 22 as compared to the first laser beam 21. After passing through the first set of lenses 141, the second laser beam 22 may reflect off a second mirror 132 directing the second laser beam 22 back toward the first laser beam 21. The separate optical train may have a second distance B1 measured between the first mirror 131 and the second mirror 132. The first and second distances A1, B1 may remain constant, even when lens spacing H1 is varied. Alternatively, the first set of lenses 141 may be positioned elsewhere in the separate optical train, such as between the first polarizing beam splitter 121 and the first mirror 131, or between the second mirror 132 and a second polarizing beam splitter 122.

The first laser beam 21 and the second laser beam 22 may be directed to converge at the second polarizing beam splitter 122, used to recombine the first and second laser beams 21, 22. In this way, the first laser beam 21 may pass through the second polarizing beam splitter 122 without changing direction. The second laser beam 22 may be made to reflect inside the second polarizing beam splitter 122 to collinearly converge the first laser beam 21 and the second laser beam 22 along a mutual path 30. The convergence of the first laser beam 21 and the second laser beam 22 will modify the polarization state of the respective laser beams. The collinearly converged first laser beam 21 and second laser beam 22 may pass through a focusing lens 150 used to concentrate the first and second laser beams 21, 22 to a first focus point 151 and a second focus point 152, respectively.

Accordingly, the collinearly converged first and second laser beams 21, 22, may act like a single beam along the mutual path 30, but having a plurality of foci, such as two foci according to an exemplary embodiment, and offset from one another. The first focus point 151 may have a first focus distance Df1 from the focusing lens 150 and the second focus point 152 may have a second focus distance Df2 from the focusing lens 150. The first and second focus distances Df1, Df2 may be calculated according to equations (2) and (4) above. By changing settings of the first set of lenses 141, which includes a change in the lens spacing H1, the second focus point 152 may be changed (i.e., moved closer to or farther away from the first focus point 151).

Table 1-1 below demonstrates how changes in lens spacing H1 may vary the second focus distance Df2 and a spot radius (i.e., a beam waist size) correspond to that focus point (all measurements in millimeters; A1=40 mm; B1=80 mm).

TABLE 1-1

Second Laser Beam Path

| H1 | Spot Radius | Df2 |
|---|---|---|
| 4 | 5.72E−04 | 1.96 |
| 5 | 5.82E−04 | 2.075 |
| 6 | 5.92E−04 | 2.188 |
| 7 | 6.03E−04 | 2.3 |
| 8 | 6.13E−04 | 2.42 |
| 9 | 6.25E−04 | 2.55 |

Table 1-2 below demonstrates how changes in distance D0 do not vary the first focus distance Df1, but do vary the spot radius (i.e., a beam waist size) correspond to that focus point (all measurements in millimeters).

TABLE 1-2

First Laser Beam Path

| D0 | Spot Radius | Df1 |
|---|---|---|
| 80 | 5.40E−04 | 1.56 |
| 120 | 5.38E−04 | 1.56 |
| 160 | 5.39 | 1.56 |

In contrast, a primary optical train distance D0 may optionally be fixed or otherwise remain unchanged. The primary optical train distance D0 may be measured between the first polarizing beam splitter 121 and the focusing lens 150. Alternatively, the primary optical train distance D0 may be modified or additional components added in the primary optical train. For example, an additional set of lenses 140 may be placed between the first and second polarizing beam splitters 121, 122. Modifying a lens spacing H2 of the additional set of lenses 140 may change the first focus distance Df1 associated with the first focus point 151. Alternatively or in addition, one or more wave-plates may be included in one or more parts of the optical train to selectively vary the amount of power directed into the respective optical trains, or change all the focus points 151, 152 generally. For example, a wave-plate 112 may be used before the adjusted laser beam 11 enters the first polarizing beam splitter 121 to control a power ratio between the first and second laser beams 21, 22.

As a result of passing through the various optical train components, the first and second laser beams 21, 22 may have considerably less power than the initial laser beam 10. Thus, it may be desirable in certain embodiments that an initial power level of the initial laser beam 10 be sufficient such that each of the plurality of laser beams, e.g. the first and second laser beams 21, 22, once collinearly converged still has enough power to exceed a bulk damage threshold of the glass being processed. In this way, a single laser beam source may be used to create a co-linear set of laser beams having multiple foci, which may be used to simultaneously create a plurality of flaws in glass with a single pass.

Figure 2:
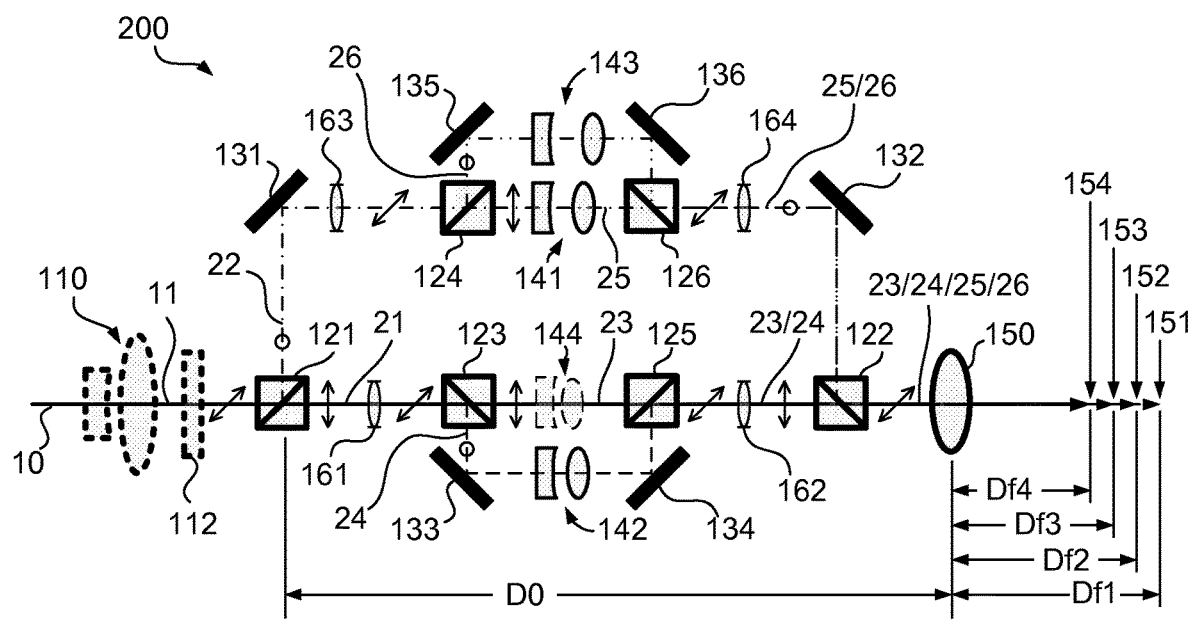
FIG. 2 is a schematic plan view of an exemplary optical arrangement for a multiple foci laser beam according to another embodiment of the disclosure.

FIG. 2 illustrates a further exemplary optical arrangement 200 according to various embodiments described herein. The optical arrangement 200 includes four separate optical trains that include a series of lenses, beam splitters, and mirrors used to separate the beam multiple times, and later recombine all the separated beams. Once the beams are separated, a focus of at least three of the beams may be changed in accordance with Equations 1-4, described above. Thus, when the plurality of beams are recombined, they will act like a single beam having a plurality of foci.

In various exemplary embodiments, the first portion of the optical arrangement 200 may be similar to the optical arrangement 100 described above with regard to FIG. 1. For example, the initial laser beam 10 may optionally be directed through a first set of general lenses 110, which may generate an adjusted laser beam 11 with a desired diameter and may be configured to have a linear polarization, for example with a mixed and/or arbitrary initial polarization angle. If the first set of general lenses 110 were not used, the adjusted laser beam 11 would be the same as the initial laser beam 10. The adjusted laser beam 11 may be directed into the first polarizing beam splitter 121, which will split the incident light from the adjusted laser beam 11 into two portions with orthogonal polarizations, namely a first laser beam 21 and a second laser beam 22. A direction of the first laser beam 21 may continue in the same direction as the adjusted laser beam 11, while the second laser beam 22 is reflected along a second path orthogonal to the first path. In this way, the second laser beam 22 may be directed through a separate optical train than the first laser beam 21.

The optical arrangement 200 may, in various embodiments, differ from the optical arrangement 100, described above with regard to FIG. 1, for example after the adjusted laser beam 11 is split into the first laser beam 21 and the second laser beam 22. By way of example, the first laser beam 21 may be directed through a third polarizing beam splitter 123, which will split the incident light from the first laser beam 21 into a third laser beam 23 and a fourth laser beam 24. A direction of the third laser beam 23 may continue in the same direction as the first laser beam 21, while the fourth laser beam 24 may be reflected along a third path orthogonal to the first path. In this way, the fourth laser beam 24 may be directed through a separate optical train than the third laser beam 23.

The second laser beam 22 may still be directed through the first mirror 131, but then be directed through a fourth polarizing beam splitter 124, which will split the incident light from the second laser beam 22 into a fifth laser beam 25 and a sixth laser beam 26. A direction of the fifth laser beam 25 may continue in the same direction as the second laser beam 22, while the sixth laser beam 26 may be reflected along a fourth path orthogonal to the second path. In this way, the sixth laser beam 26 may be directed through a separate optical train than the fifth laser beam 25. The fifth laser beam 25 may be made to pass through the first set of lenses 141 to generate a specific divergence, resulting in the fifth laser beam 25 having a unique focus point.

In regard to the lower two optical trains (per the orientation in FIG. 2), the fourth laser beam 24 may be directed into a third mirror 133, which may reflect the fourth laser beam 24 through a second set of lenses 142. The second set of lenses 142 may be specifically matched to one another and configured a certain distance apart from one another to generate a specific divergence. The specific divergence may be used to impart a unique focus point to the fourth laser beam 24. After passing through the second set of lenses 142, the fourth laser beam 24 may reflect off a fourth mirror 134 directing the fourth laser beam 24 back toward the third laser beam 23. The third laser beam 23 and the fourth laser beam 24 may be directed to converge at a fifth polarizing beam splitter 125, used to recombine the third and fourth laser beams 23, 24. In this way, the third laser beam 23 may pass through the fifth polarizing beam splitter 125 without changing direction. The fourth laser beam 24 may be made to reflect inside the fifth polarizing beam splitter 125 to collinearly converge the third laser beam 23 and the fourth laser beam 24 along a mutual path. The convergence of the third laser beam 23 and the fourth laser beam 24 will modify the polarization state of the respective laser beams.

In regard to the upper two optical trains (per the orientation in FIG. 2), the sixth laser beam 26 may be directed into a fifth mirror 135, which may reflect the sixth laser beam 26 through a third set of lenses 143. The third set of lenses 143 may be specifically matched to one another and configured a certain distance apart from one another to generate a specific divergence. The specific divergence may be used to impart a unique focus point to the sixth laser beam 26. After passing through the third set of lenses 143, the sixth laser beam 26 may reflect off a sixth mirror 136 directing the sixth laser beam 26 back toward the fifth laser beam 25. The fifth laser beam 25 and the sixth laser beam 26 may be directed to converge at a sixth polarizing beam splitter 126, used to recombine the fifth and sixth laser beams 25, 26. In this way, the fifth laser beam 25 may pass through the sixth polarizing beam splitter 126 without changing direction. The sixth laser beam 26 may be made to reflect inside the sixth polarizing beam splitter 126 to collinearly converge the fifth laser beam 25 and the sixth laser beam 26 along a mutual path. The convergence of the fifth laser beam 25 and the sixth laser beam 26 will modify the polarization state of the respective laser beams.

Optionally, between the third polarizing beam splitter 123 and the fifth polarizing beam splitter 125, the third laser beam 23 may pass through a fourth set of lenses 144 to change a focus point of the third laser beam 23 before being recombined with the fourth laser beam 24.

The third and fourth laser beams 23, 24 and the fifth and sixth laser beams 25, 26 may be directed to converge at the second polarizing beam splitter 122, used to recombine the third, fourth, fifth, and sixth laser beams 23, 24, 25, 26. In this way, the third and fourth laser beams 23, 24 may pass through the second polarizing beam splitter 122 without changing direction. The fifth and sixth laser beams 25, 26 may be made to reflect off the second mirror 132 and reflect inside the second polarizing beam splitter 122 to collinearly converge the third and fourth laser beams 23, 24 and the fifth and sixth laser beams 25, 26 along a mutual path. The convergence of the third, fourth, fifth, and sixth laser beams 23, 24, 25, 26 will modify the polarization state of the respective laser beams. The collinearly converged third, fourth, fifth, and sixth laser beams 23, 24, 25, 26 may pass through the focusing lens 150 used to concentrate the beams to a first focus point 151, a second focus point 152, a third focus point 153, and a fourth focus point 154, respectively.

Accordingly, the collinearly converged third, fourth, fifth, and sixth laser beams 23, 24, 25, 26 may act like a single beam along a mutual path, but having multiple foci (i.e., at least four focus points) offset from one another. Each of the first, second, third, and fourth focus points 151, 152, 153, 154, may be disposed at different distances from the focusing lens 150; namely, first, second, third, and fourth focus distances Df1, Df2, Df3, Df3, respectively. By changing settings of the first set of lenses 141, which includes a change in the lens spacing H1 (e.g., FIG. 1), the second focus point 152 may be changed (i.e., moved closer to or further away from the first focus point 151), according to various exemplary embodiments.

The process of splitting a laser beam twice before recombining the separated parts may result in the collinearly converged third, fourth, fifth, and sixth laser beams 23, 24, 25, 26 not all having the same polarization angle. Thus, a first, second, third, and fourth polarization rotator 161, 162, 163, 164 may optionally be used to ensure the collinearly converged third, fourth, fifth, and sixth laser beams 23, 24, 25, 26 all have the same polarization angle.

For example, the first laser beam 21 exiting the first polarizing beam splitter 121 may have a linear polarization at 90°, but after passing through first polarization rotator 161 may have a linear polarization at 45°. In this way, when the first laser beam 21 enters the third polarizing beam splitter 123 the linear polarization angle is the same as when the adjusted laser beam 11 entered the first polarizing beam splitter 121. Thus, by placing a polarization rotator in the optical train before each laser beam is split a second time and after the twice separated laser beams are recombined, the collinearly converged third, fourth, fifth, and sixth laser beams 23, 24, 25, 26 may have the same polarization angle. Accordingly, the first polarization rotator 161 may be disposed between the first polarizing beam splitter 121 and the third polarizing beam splitter 123; the second polarization rotator 162 may be disposed between the fifth polarizing beam splitter 125 and the second polarizing beam splitter 122; the third polarization rotator 163 may be disposed between the first polarizing beam splitter 121 and the fourth polarizing beam splitter 124; and the fourth polarization rotator 164 may be disposed between the sixth polarizing beam splitter 126 and the second polarizing beam splitter 122. In this way, a polarization state of the third, fourth, fifth, and sixth laser beams 23, 24, 25, 26, when recombined, will be a vectorial additive combination.

One or more optional wave plates may be used to control polarization of the combined laser beams. For example, a quarter-wave plate (not shown) may be included between the second polarization beam splitter 122 and the focusing lens 150 to convert the combined third, fourth, fifth, and sixth laser beams 23, 24, 25, 26 to each have circular polarization. Circular polarization may more consistently transfer power from the combined third, fourth, fifth, and sixth laser beams 23, 24, 25, 26 to the transparent material, forming a more reliable flaw or series of flaws. Alternatively or in addition, one or more wave-plates may be included in one or more parts of the optical train to selectively vary the amount of power directed into the respective optical trains. For example, a wave-plate 112 may be used before the adjusted laser beam 11 enters the first polarizing beam splitter 121 to control a power ratio between the first and second laser beams 21, 22.

By including additional optical train components, the third, fourth, fifth, and sixth laser beams 23, 24, 25, 26 produced by the optical arrangement 200 may have significantly reduced power. Thus, an initial power level of the initial laser beam 10 in the optical arrangement 200 may be chosen according to various embodiments to be sufficient in order to ensure that each of the third, fourth, fifth, and sixth laser beams 23, 24, 25, 26, once collinearly converged, still has enough power to exceed a bulk damage threshold of the glass being processed. In this way, a single laser beam source may be used to create a co-linear set of laser beams having multiple foci, which may be used to simultaneously create separate scribe lines in glass with a single pass. In addition, using the techniques disclosed with regard to the optical arrangement 200, more than four collinear foci may be formed, limited only by the total laser power and the power damage threshold of the optics involved.

Figure 3A:
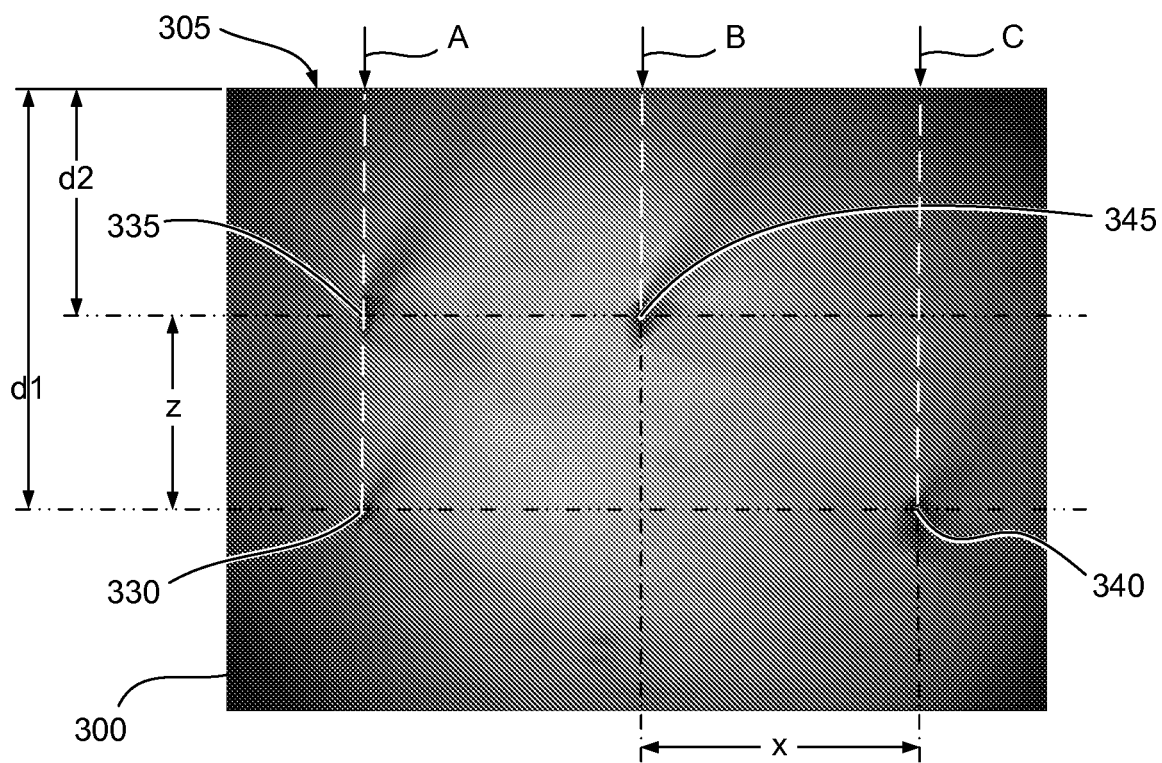
FIG. 3A is a side elevation image of an exemplary transparent article with multiple scribe lines according to an embodiment of the disclosure.

FIG. 3A illustrates a side elevation image of an exemplary transparent article 300 processed by an optical arrangement according to non-limiting embodiments of the disclosure. In particular, FIG. 3A shows four separate flaws 330, 335, 340, 345 visible in the transparent article 300, which were formed by three separate passes A, B, C using the optical arrangement 100 (FIG. 1) with different setting in each pass A, B, C. The exemplary transparent article 300 is a laminate glass. An ultraviolet laser with an output wavelength at 355 nm was used to generate the flaws 330, 335, 340, 345. In particular, the laser was a pulsed laser operating at 120 kHz, and producing an average 1.2 watts power for each of the plurality of laser beams (i.e. 21 and 22 in FIG. 1), for a total of approximately 2.3 watts of total power when the two laser beams were recombined. The total power may take into account losses from passing through the various components of the optical trains. The foci of the separate laser beams were spaced apart by approximately 350 µm. The exemplary transparent article 300 was mounted on a vacuum chuck, which itself was mounted on two linear stages. To generate the flaws 330, 335, 340, 345, the exemplary transparent article 300 was translated in the three separate passes A, B, C, at a rate of 100 mm/sec relative to a laser head producing the initial laser beam.

Prior to creating the first and second flaws 330, 335 in the transparent article 300, there was a concern that the damage from the first flaw 330 would interfere with the focus position creating the second flaw 335, since the second flaw 335 lies directly below the first flaw 330. In this way, it was thought that the first flaw 330 might defocus the second focus position forming the second flaw 335, since the first flaw 330 is disposed between the source of the laser beam and a position of the second flaw 335 itself. However, the results shown in FIG. 3A demonstrate little or no interference by the first flaw 330 on the second flaw 335. In particular, the size of the first flaw 330 is roughly the same as the second flaw 335, which was formed at the same time. As a comparison, the third flaw 345 and the fourth flaw 340 were respectively formed in separate passes B, C, but similarly have roughly the same size.

Figure 3B:
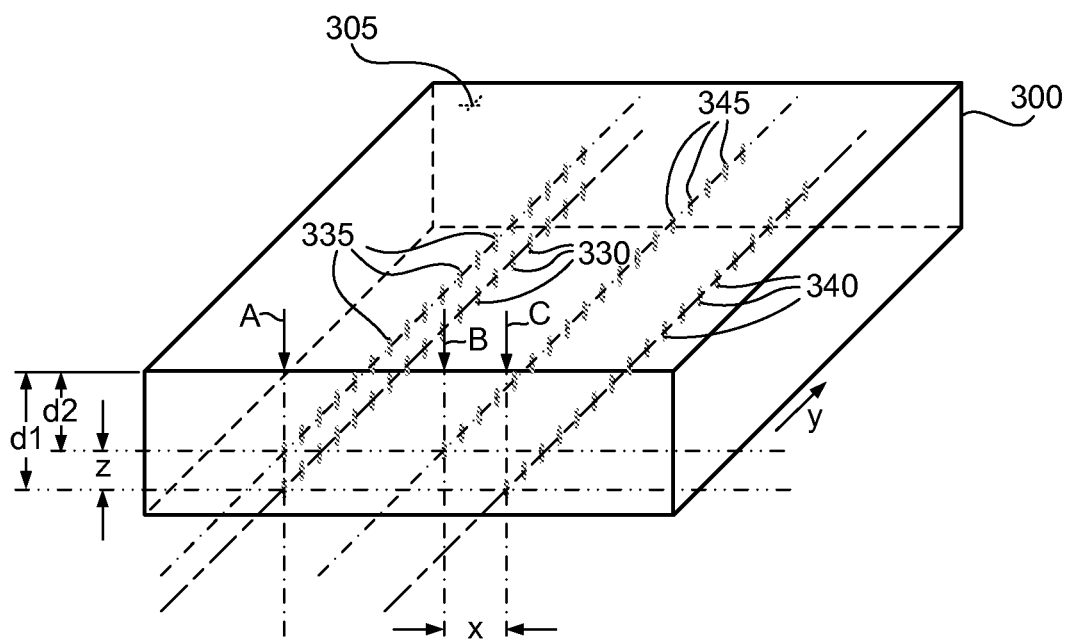
FIG. 3B is a schematic perspective view of the exemplary transparent article including the multiple scribe lines of FIG. 3A according to an embodiment of the disclosure.

FIG. 3B illustrates a schematic representation of the exemplary transparent article 300 from FIG. 3A. As shown, each of the flaws 330, 335, 340, 345 repeat in a series extending in a y-direction. According to various embodiments, with each of the passes A, B, C, the laser may be directed vertically into a top surface 305 to create flaws below the surface, and moved across the top surface 305 in the y-direction, creating a series of each of the flaws 330, 335, 340, 345 at the same depth. The series of each of the flaws 330, 335, 340, 345 corresponds to scribe lines below the top surface 305 (i.e., in the bulk of the transparent article 300), used for cutting the transparent article 300.

In FIGS. 3A and 3B, a first pair of flaws on the left side of the transparent article 300 include the first flaw 330 and the second flaw 335. The first and second flaws 330, 335 were formed as a result of putting the exemplary optical arrangement 100 (FIG. 1) into practice with the collinearly converged first and second laser beams (e.g., 21, 22) directed into a top surface 305 of the transparent article 300 as part of a first pass A. The first and second flaws 330, 335 were created simultaneously, while the third flaw 345 and fourth flaw 340 were created separately from one another as well as separately from both the first and second flaws 330, 335. A first focus point (e.g., 151 in FIG. 1) of the first laser beam (e.g., 21 in FIG. 1) coincides with a first depth d1 below the top surface 305. Also, a second focus point (e.g., 152 in FIG. 1) of the second laser beam (e.g., 22 in FIG. 1) coincides with a second depth d2 below the top surface 305. In this way, the first flaw 330 is offset from the second flaw 335 by an offset distance z, but the first and second flaws 330, 335 are vertically aligned. The offset distance z corresponds to a particular lens spacing (e.g., H1) of a first set of lenses (e.g., 141) in the optical arrangement.

In FIGS. 3A and 3B, the third flaw 345 and fourth flaw 340 on the right side of the transparent article 300 were formed separately as a result of putting the exemplary optical arrangement 100 (FIG. 1) into practice, but using only one of the two optical trains at a time. For example, the first laser beam (e.g., 21) may be blocked to direct the second laser beam (e.g., 22) by itself into the top surface 305 of the transparent article 300 to produce the third flaw 345 as part of the second pass B. In addition, as part of the third pass C, the second laser beam (e.g., 22) may be blocked to allow the first laser beam (e.g., 21) by itself into the top surface 305 of the transparent article 300 to produce the fourth flaw 340.

According to various embodiments, laser beams may be blocked in a variety of ways. For example, an additional set of lenses may be introduced in the laser beam path before the first polarizing beam splitter (e.g., 140 in FIG. 1). By then changing a polarization angle of the initial laser beam using that additional set of lenses, one of the first and second laser beams may be limited or blocked. In this way, the polarization angle of the laser beam (e.g., adjusted laser beam 11 in FIG. 1) entering the first polarization beam splitter (e.g., 121) may be modified selectively to limit what portion of the input laser beam's power is directed to each of the two optical trains. As a further exemplary embodiment, an additional mirror may be selectively used in one of the first or second laser beam paths to redirect the selected laser beam out of the optical train so that it does not reach the focusing lens 150. Other ways known for blocking laser beams are also intended to be included within the scope of the disclosure.

Figure 4:
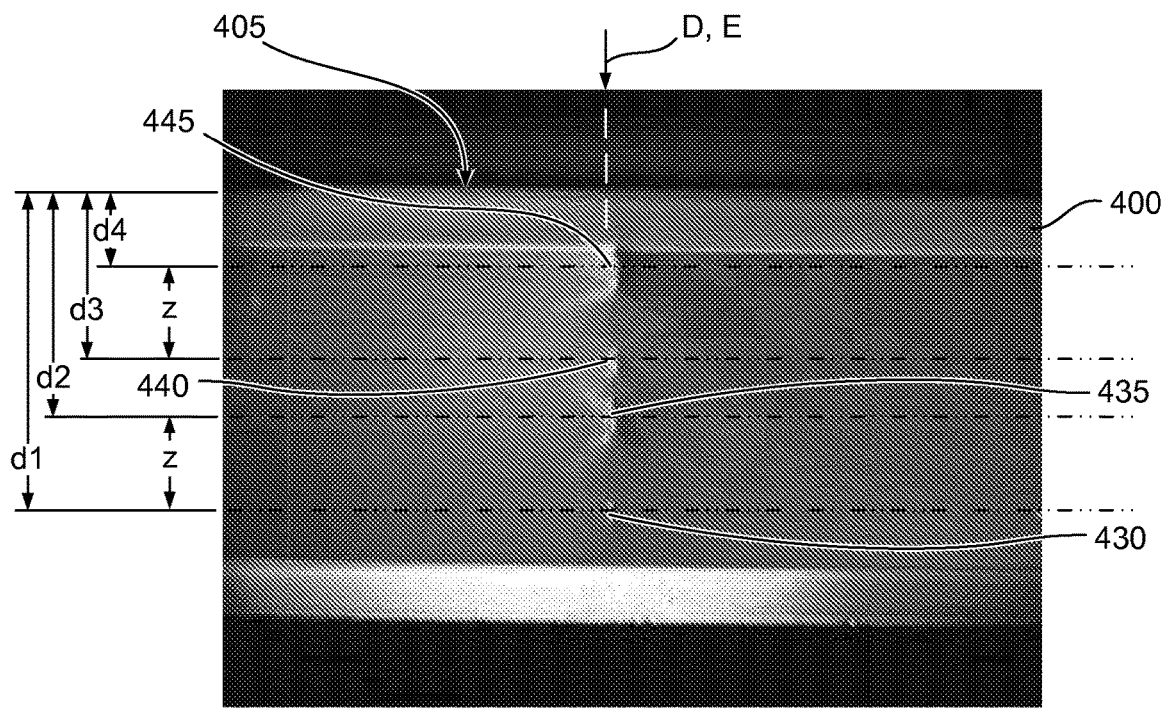
FIG. 4 is a side elevation image of an exemplary transparent article including stacked scribe line pairs according to an embodiment of the disclosure.

FIG. 4 illustrates a side elevation image of a transparent article 400 processed by an optical arrangement according to exemplary and non-limiting embodiments of the disclosure. In particular, FIG. 4 shows the results of two separate passes D, E over the same vertical line on the transparent article 400. Each pass D, E involves a vertical translation of the laser head across the transparent article 400 in the y-direction (into or out of the page). Both passes D, E used the exemplary optical arrangement 100 (FIG. 1) with the laser head producing collinearly converged first and second laser beams with multiple foci. However, a different spacing between the laser head (e.g., focusing lens 150) and a top surface 405 of the transparent article was used for each pass D, E. The z height is the distance between the laser head and a top surface 405 of the transparent article.

The first pass D produced the two lowest (per the orientation in FIG. 4) flaws, namely the first flaw 430 and the second flaw 435. The first and second flaws 430, 435 were formed simultaneously as a result of putting the exemplary optical arrangement 100 (FIG. 1) into practice with the collinearly converged first and second laser beams (e.g., 21, 22) directed into the top surface 405 of the transparent article 400 as part of a first pass D. A first focus point (e.g., 151 in FIG. 1) of the first laser beam (e.g., 21 in FIG. 1) coincides with a first depth d1 below the top surface 405. Also, a second focus point (e.g., 152 in FIG. 1) of the second laser beam (e.g., 22 in FIG. 1) coincides with a second depth d2 below the top surface 405. In this way, the first flaw 430 is offset from the second flaw 435 by an offset distance z, but the first and second flaws 430, 435 are vertically aligned. The offset distance z corresponds to a particular lens spacing (e.g., H1) of a first set of lenses (e.g., 141) in the optical arrangement.

The second pass E produced the two upper (per the orientation in FIG. 4) flaws, namely the third flaw 440 and the fourth flaw 445. The third and fourth flaws 440, 445 were also formed simultaneously as a result of putting the exemplary optical arrangement 100 (FIG. 1) into practice with the collinearly converged first and second laser beams (e.g., 21, 22) as part of a second pass E. In contrast to the first pass D, a distance between the laser head and the top surface 405 was increased for the second pass E. Thus, on the second pass E, the first focus point of the first laser beam coincides with a third depth d3 below the top surface 405. Also on the second pass E, the second focus point of the second laser beam coincides with a fourth depth d4 below the top surface 405. In this way, the third flaw 440 is offset from the fourth flaw 445 by the same offset distance z as the first and second flaws 430, 435. In addition, like the first and second flaws 430, 435, the third and fourth flaws 440, 445 are vertically aligned. The offset distance z is unchanged between the first pass D and the second pass E as a result of using the same settings (i.e., spacing distance) of the first set of lenses in the optical arrangement.

The resultant plurality of flaws, namely the first, second, third, and fourth flaws 430, 435, 440, 445, demonstrate that a plurality of scribe lines created in multiple passes with the laser head may be vertically stacked. However, since the upper pair of flaws (the third and fourth flaws 440, 445) were produced subsequent to the lower pair of flaws (the first and second flaws 430, 435), interference between the first and second passes D, E is not expected. In this way, stacking the pairs of scribe lines is analogous to stacking single scribe lines using multiple passes with a single focus laser beam.

Figure 5:
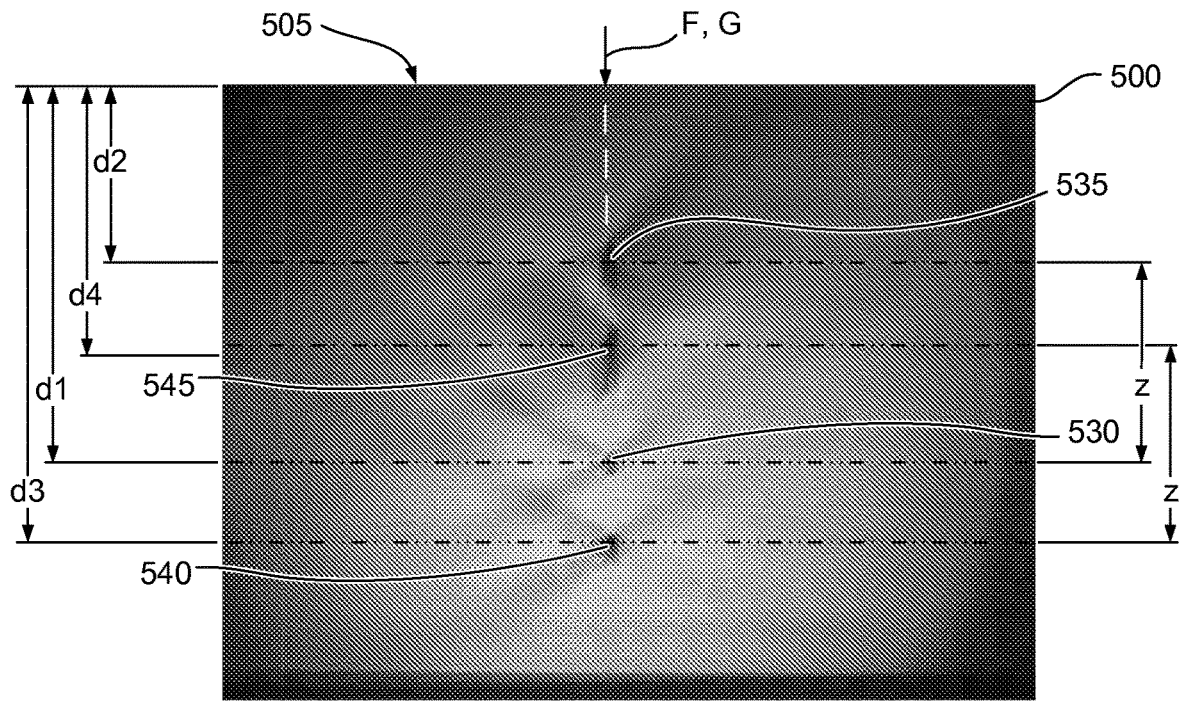
FIG. 5 is a side elevation image of an exemplary transparent article including interleaved scribe line pairs according to an embodiment of the disclosure.

FIG. 5 illustrates a side elevation image of a transparent article 500 processed by an optical arrangement according to non-limiting embodiments of the disclosure. In particular, FIG. 5 shows the results of two separate passes F, G over the same vertical line on the transparent article 500. In contrast to the passes D, E on the transparent article 400 (FIG. 4), the passes F, G interleave the arrangement of paired flaws. Each pass F, G still involves a vertical translation of the laser head across the transparent article 500 in the y-direction (into or out of the page). Both passes F, G used the optical arrangement 100 (FIG. 1) with the laser head producing collinearly converged first and second laser beams with multiple foci. In addition, similar to the embodiment described above with regard to FIG. 4, a common z height was used for each pass F, G.

The first pass F produced the first flaw 530 and the second flaw 535. The first and second flaws 530, 535 were formed simultaneously as a result of putting the exemplary optical arrangement 100 (FIG. 1) into practice with the collinearly converged first and second laser beams (e.g., 21, 22) directed into the top surface 505 of the transparent article 500 as part of the first pass F. A first focus point (e.g., 151 in FIG. 1) of the first laser beam (e.g., 21 in FIG. 1) coincides with a first depth d1 below the top surface 405. Also, a second focus point (e.g., 152 in FIG. 1) of the second laser beam (e.g., 22 in FIG. 1) coincides with a second depth d2 below the top surface 405. In this way, the first flaw 530 is offset from the second flaw 535 by an offset distance z, but the first and second flaws 530, 535 are vertically aligned. The offset distance z corresponds to a particular lens spacing (e.g., H1) of a first set of lenses (e.g., 141) in the optical arrangement.

The second pass G produced the third flaw 540 and the fourth flaw 545. The third and fourth flaws 540, 545 were also formed simultaneously as a result of putting the exemplary optical arrangement 100 (FIG. 1) into practice with the collinearly converged first and second laser beams (e.g., 21, 22) as part of a second pass G. In contrast to the first pass F, a distance between the laser head and the top surface 505 was increased for the second pass G. Thus, on the second pass G the first focus point of the first laser beam coincides with a third depth d3 below the top surface 505. Also on the second pass G, the second focus point of the second laser beam coincides with a fourth depth d4 below the top surface 505. In this way, the third flaw 540 is offset from the fourth flaw 545 by the same offset distance z as the first and second flaws 530, 535. In addition, like the first and second flaws 530, 535, the third and fourth flaws 540, 545 are vertically aligned. The offset distance z is unchanged between the first pass F and the second pass G as a result of using the same settings (i.e., spacing distance) of the first set of lenses in the optical arrangement.

The resultant plurality of flaws, namely the first, second, third, and fourth flaws 530, 535, 540, 545, demonstrate that a plurality of scribe lines created in multiple passes with the laser head may not only be vertically stacked, but may also be interleaved (i.e., arranged in an alternating sequence) without interfering with one another, according to at least certain exemplary embodiments. In particular, the third flaw 540 was produced on the second pass G regardless of the first and second flaws 530, 535 being there before hand and being disposed directly above the location of the third flaw 540. Similarly the fourth flaw 545 was also produced on the second pass G between the first and second flaws 530, 535 that had been created on the first pass F. This interleaved arrangement produces an unexpected result, since interference between the overlapping flaws is expected. The ability to interleave the scribe lines may increase the efficiency of creating multiple scribe lines by reducing the number of passes needed. In addition to changing a z height of the laser head, by changing a lens spacing (e.g., H1) of the first set of lenses, the offset distance z may also be changed with each pass. An interleaved arrangement of scribe lines may be useful for processing different thicknesses of glass work pieces. In addition the interleaved arrangement may be used to fine-tune a precise location of scribe lines relative to a stress profile of a strengthened or laminate transparent article being processed.

Figure 6:
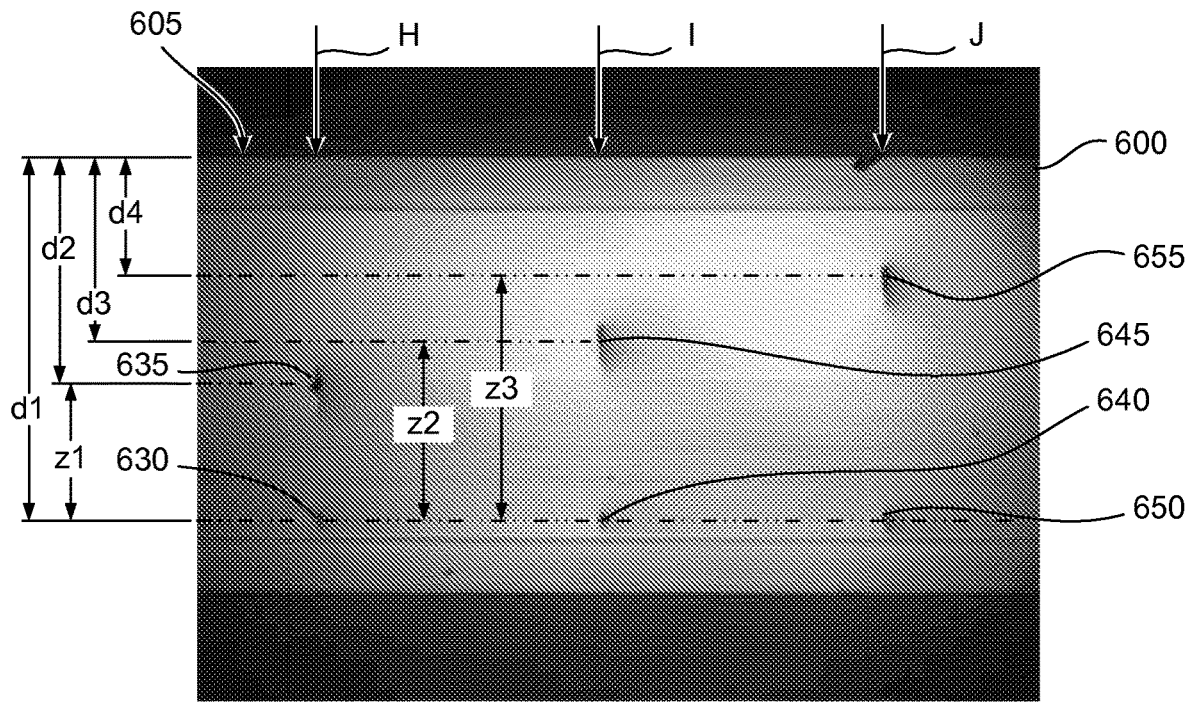
FIG. 6 is a side elevation image of an exemplary transparent article including variable scribe line separations according to an embodiment of the disclosure.

FIG. 6 illustrates a side elevation image of a transparent article 600 processed by an exemplary optical arrangement according to non-limiting embodiments of the disclosure. In particular, FIG. 6 shows the capability of producing a plurality of scribe lines with variable separation, as demonstrated from three separate passes H, I, J.

The first pass H produced the two left most (per the orientation in FIG. 6) flaws, namely the first flaw 630 and the second flaw 635. The first and second flaws 630, 635 were formed simultaneously as a result of putting the exemplary optical arrangement 100 (FIG. 1) into practice with the collinearly converged first and second laser beams (e.g., 21, 22) directed into the top surface 605 of the transparent article 600 as part of the first pass H. A first focus point (e.g., 151 in FIG. 1) of the first laser beam (e.g., 21 in FIG. 1) coincides with a first depth d1 below the top surface 605. Also, a second focus point (e.g., 152 in FIG. 1) of the second laser beam (e.g., 22 in FIG. 1) coincides with a second depth d2 below the top surface 605. In this way, the first flaw 630 is offset from the second flaw 635 by a first offset distance z1, but the first and second flaws 630, 635 are vertically aligned. The first offset distance z1 corresponds to a first spacing distance of a first set of lenses (e.g., 141) in the optical arrangement.

The second pass I produced the two center (per the orientation in FIG. 6) flaws, namely the third flaw 640 and the fourth flaw 645. The first laser beam maintains the first focus point, which coincides with the same first depth d1 below the top surface 605 as the first pass H. In contrast, a third focus point of the second laser beam coincides with a third depth d3 below the top surface 605. In this way, the third flaw 640 is offset from the fourth flaw 645 by a second offset distance z2, but the third and fourth flaws 640, 645 are vertically aligned. The second offset distance z2 corresponds to a second spacing distance of the first set of lenses in the optical arrangement.

The third pass J produced the two right most (per the orientation in FIG. 6) flaws, namely the fifth flaw 650 and the sixth flaw 655. Once again, the first laser beam maintains the first focus point, which coincides with the same first depth d1 below the top surface 605 as the first and second passes H, I. In contrast, a fourth focus point of the second laser beam coincides with a fourth depth d4 below the top surface 605. In this way, the fifth flaw 650 is offset from the sixth flaw 655 by a third offset distance z3, but the fifth and sixth flaws 650, 655 are vertically aligned. The third offset distance z3 corresponds to a third spacing distance of the first set of lenses in the optical arrangement.

Figure 7:
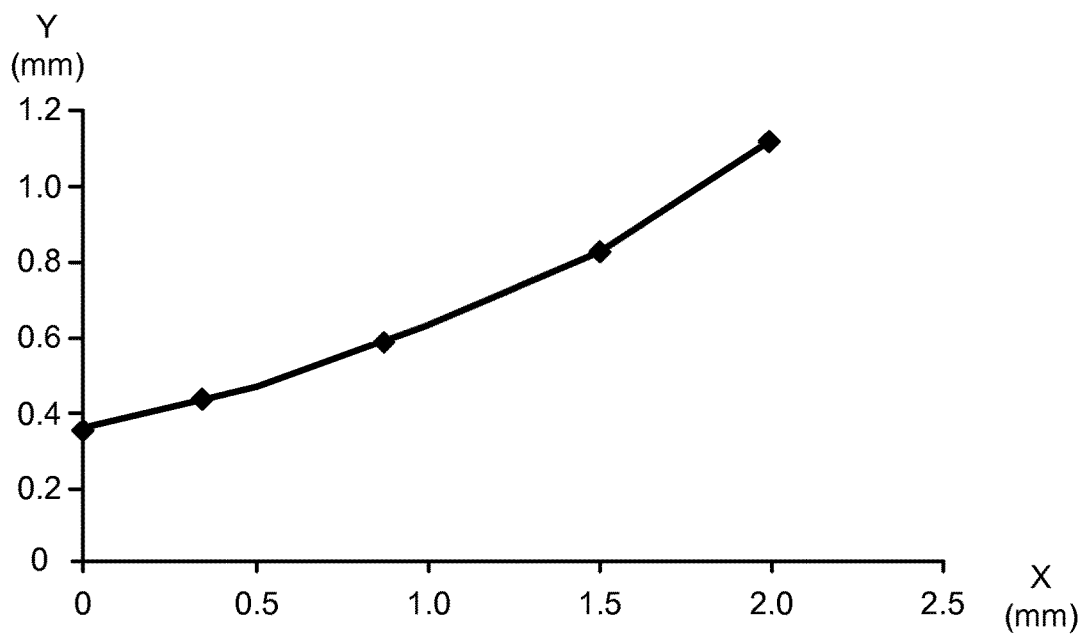
FIG. 7 is a graphical representation of a vertical scribe line separation as a function of lens separation according to an embodiment of the disclosure.

FIG. 7 illustrates a graphical representation of the relative vertical separation between scribe lines as compared to lens separation distances, according to various exemplary embodiments. The y-axis (i.e., vertical) corresponds to scribe line separation distances measured in millimeters. The x-axis (i.e., horizontal) corresponds to lens spacing (e.g., H1 in FIG. 1) also measured in millimeters. Thus, the results of five different lenses settings are depicted in the graph of FIG. 7. The first of the settings (farthest left) uses no separation between lenses and yet achieves almost 0.4 mm of scribe line separation. In contrast, the last of the settings (farthest right) uses a 2 mm separation between lenses and achieve over 1.0 mm of separation between scribe lines.

Figure 8:
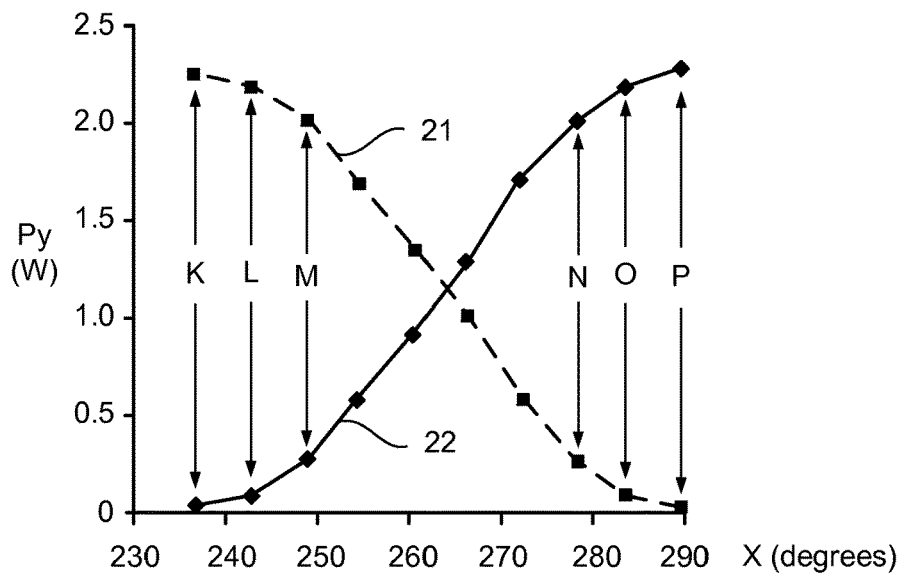
FIG. 8 is a graphical representation comparing the average power of first and second laser beams as a function of wave-plate settings according to an embodiment of the disclosure.

FIG. 8 illustrates a graphical representation of the average power output by each optical train path associated with the first and second laser beams, according to various exemplary embodiments. The power output of the first and second laser beams may optionally be varied using one or more waveplates (e.g., 112 described with regard to FIGS. 1 and 2). The additional set of half-wave plate may provide for a selective power balancing between the two optical trains. Balancing the power of the first and second laser beams may ensure that each scribe line has the same effective damage (i.e., creates same size flaw). Alternatively, the relative power output may be deliberately unbalanced such that one scribe line has more or less effective damage than the other.

In FIG. 8, the vertical axis represents the power level in wattage Py supplied to the respective first and second laser beams 21, 22. The horizontal axis represents rotational angle settings of the one or more wave-plates (e.g., 112) used to limit and/or block power to either of the first and second laser beams 21, 22. In the graph, the rotational angle of the additional set of half-wave plate ranges from 230°-290°. These angles may be unique to a particular optical arrangement chosen according to various embodiments described herein.

An exemplary first pair of marks on the graph (farthest left) is associated with less than the 240° rotational angle and reflects the first laser beam 21 having a power level of approximately 2.3 W and the second laser beam 22 having a power level of almost 0. The first pair of marks on the graph may be associated with a first pass K of the collinearly converged first and second laser beams 21, 22 over glass (e.g., the transparent article 900 in FIG. 9) for generating flaws.

An exemplary second pair of marks on the graph (second from left) is associated with approximately 242° rotational angle and reflects the first laser beam 21 having a power level below 2.3 W and the second laser beam 22 having the power level of approximately 0.1 W. The second pair of marks on the graph may be associated with a second path L of the collinearly converged first and second laser beams 21, 22 over the transparent article for generating flaws.

Similarly, an exemplary third pair of marks on the graph (third from left) is associated with almost 250° rotational angle and reflects the first laser beam 21 having a power level at approximately 2.0 W and the second laser beam 22 having a power level of proximately 0.4 W. The third pair of marks on the graph may be associated with a third pass M of the collinearly converged first and second laser beams 21, 22 over the transparent article for generating flaws.

Somewhere between the rotational angles of 260° and 270° the power balance changes between the first laser beam 21 and the second laser beam 22. For example, an exemplary last pair of marks on the graph (farthest right) is associated with approximately 290° rotational angle and reflects the first laser beam 21 having a power level of approximately 0 and the second laser beam 22 having a power level of approximately 2.3 W. The last pair of marks may be associated with the sixth path P of the collinearly converged first and second laser beams 21, 22 over the transparent article.

An exemplary second to last pair of marks on the graph (second from right) is associated with approximately 283° rotational angle and reflects the first laser beam having a power level of approximately 0.1 W and the second laser beam 22 having the power level below 2.3 W. The second to last pair of marks on the graph may be associated with a fifth path O of the collinearly converged first and second laser beams 21, 22 over the transparent article.

Similarly, an exemplary third to last pair of marks on the graph (third from right) is associated with approximately 272° rotational angle and reflects the first laser beam having a power level at approximately 1.0 W and the second laser beam 22 having a power level of proximately 1.3 W. The third to last pair of marks on the graph may be associated with a fourth pass N of the collinearly converged first and second laser beams 21, 22 over the transparent article.

Figure 9A:
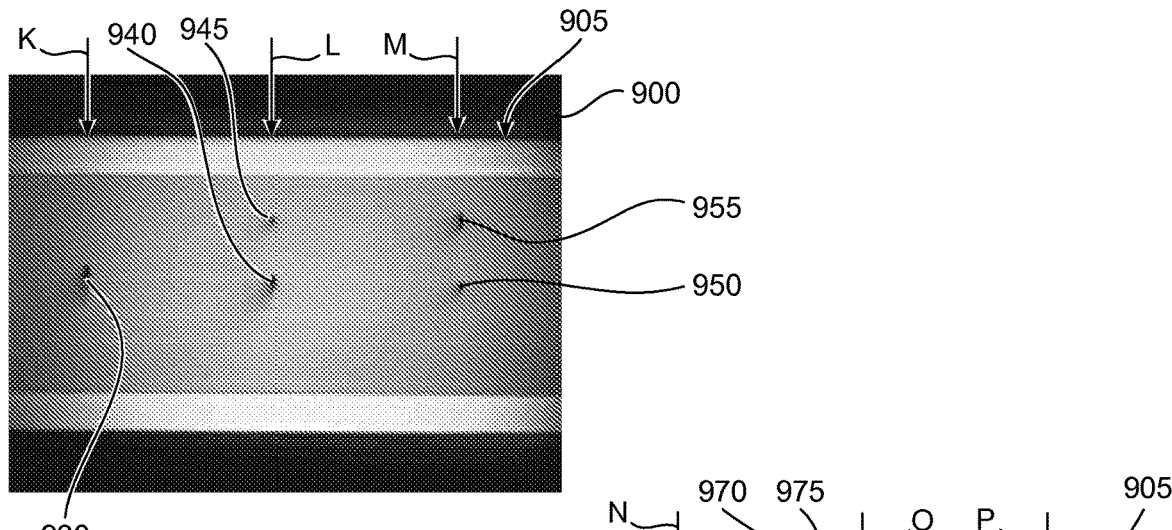
FIG. 9A is a side elevation image of an exemplary transparent article including multiple scribe lines corresponding to a first set of setting represented in the graph of FIG. 8, according to an embodiment of the disclosure.
Figure 9B:
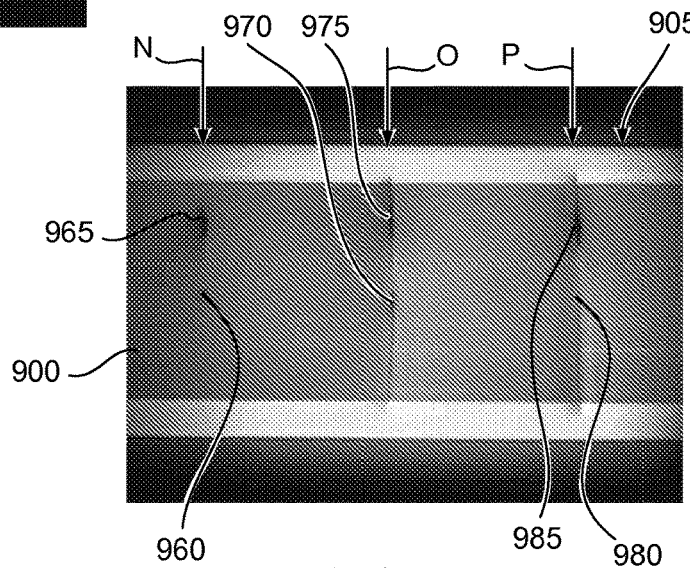
FIG. 9B is a side elevation image of an exemplary transparent article including multiple scribe lines corresponding to a second set of setting represented in the graph of FIG. 8, according to an embodiment of the disclosure.

FIGS. 9A and 9B illustrate side elevation images of a sample laminate transparent article 900 processed by an exemplary optical arrangement according to non-limiting embodiments of the disclosure. FIG. 9A shows five flaws generated using the half wave-plate settings associated with the first, second, and third passes K, L, M. A first flaw 930 was formed in the first pass K by a first laser beam (e.g., 21 FIG. 1). The damage shown reflects the high-power setting for the first laser beam. In addition, no damage is noted from the second laser beam (e.g., 22 in FIG. 1) since it was operating at a power level of almost 0, as described with regard to FIG. 8. A second flaw 940 and a third flaw 945 were formed in the second pass L by the first and second laser beams, respectively. The second flaw 940 generated by the first laser beam 21 is slightly reduced in size and the second laser beam now had a high enough power level to generate the third flaw 945. The third pass M allowed the first laser beam to produce the fourth flaw 950 and the second laser beam to produce the fifth flaw 955.

FIG. 9B includes an additional five flaws generated on a different portion of the transparent article 900 using the half wave-plate settings associated with the fourth, fifth, and sixth passes N, 0, P. A sixth flaw 960 was formed in the fourth pass N by the first laser beam (e.g., 21 in FIG. 1), while a seventh flaw 965 was also formed in the fourth pass N but by the second laser beam (e.g., 22 in FIG. 1). As seen, by the fourth pass N, more power is directed to the second laser beam, which is reflected in the larger size of the seventh flaw 965 as compared to the sixth flaw 960. An eighth flaw 970 and a ninth flaw 975 were formed in the fifth pass O by the first and second laser beams, respectively. The eighth flaw 970 generated by the first laser beam is further reduced in size and the ninth flaw 975 is further increased in size. Finally, the sixth pass P allowed the second laser beam to produce the tenth flaw 985, and it can be seen that the first laser beam did not produce a flaw. The damage shown in the sixth pass reflects the high-power setting for the second first laser beam. In addition, no damage is noted from the first laser beam since it was operating at a power level of almost 0, as described with regard to FIG. 8.

Figure 10:
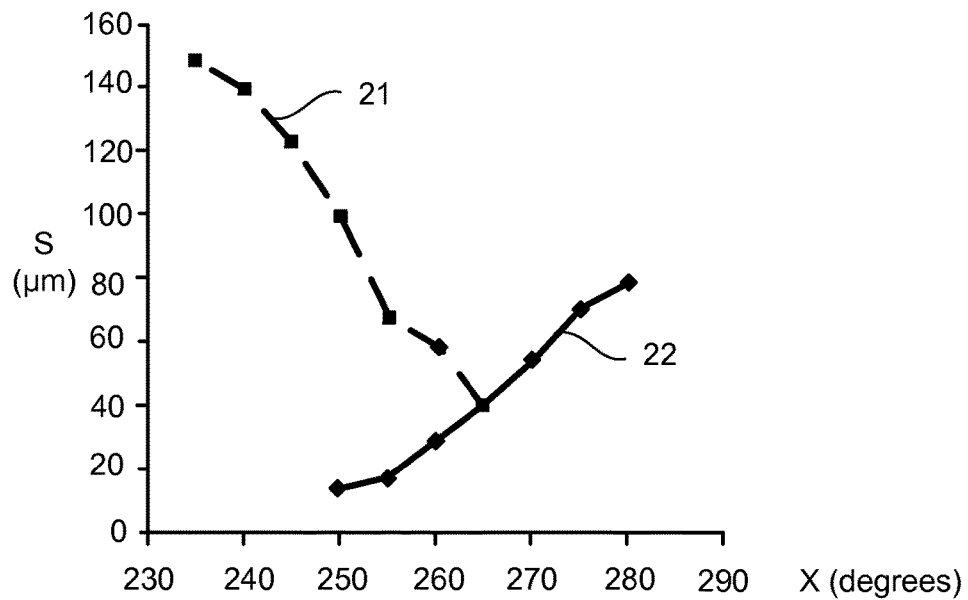
FIG. 10 is a graphical representation comparing scribe line spot size of the first and second power paths as a function of wave-plate settings according to an embodiment of the disclosure.

FIG. 10 illustrates a graphical representation of the estimated extent of damage caused in each scribe line for various power balance combinations. The vertical axis represents a spot size in microns (μm), reflecting the size of damage caused by the respective first and second laser beams 21, 22 on the transparent article. The horizontal axis represents the rotational angle settings of the one or more wave-plates (e.g., 112), similar to those rotational angles described with regard to FIG. 8. When the one or more wave-plates is set to below 250°, the second laser beam 22 is not indicated as causing a noticeable flaw (i.e., a spot size of zero). However, below the 250° polarization angle the first laser beam 21 produces its highest levels of damage.

For example, a polarization angle setting of approximately 235° corresponds to the first laser beam 21 producing a spot of almost 150 μm in size. FIG. 10 demonstrates that the spot size generated by the first laser beam 21 decreases inversely proportional to increases in the polarization angle of the wave-plate. In contrast, the spot size generated by the second laser beam 22 increases with the increase in the polarization angle of the wave-plate. The polarization angle setting of approximately 250° corresponds to when the second laser beam 22 produces a visible spot of approximately 15 μm in diameter. At a polarization angle setting of approximately 265°, the spot sizes caused by the first and second laser beams 21, 22 converge to approximately the same size (40 μm). In addition, with polarization angle settings above 265° the second laser beam 22 continues to generate larger size spots in the transparent article.

Unexpectedly, as seen in the graph in FIG. 10, the spot size damage associated with the first and second laser beams 21, 22 is not symmetrical. In other words, the first laser beam 21 consistently generated larger spot sizes than the second laser beam 22 across the spectrum of rotational angles. In addition, the second laser beam 22 generated flaws that were difficult to estimate, which is not clearly reflected in the graph.

Figure 11:
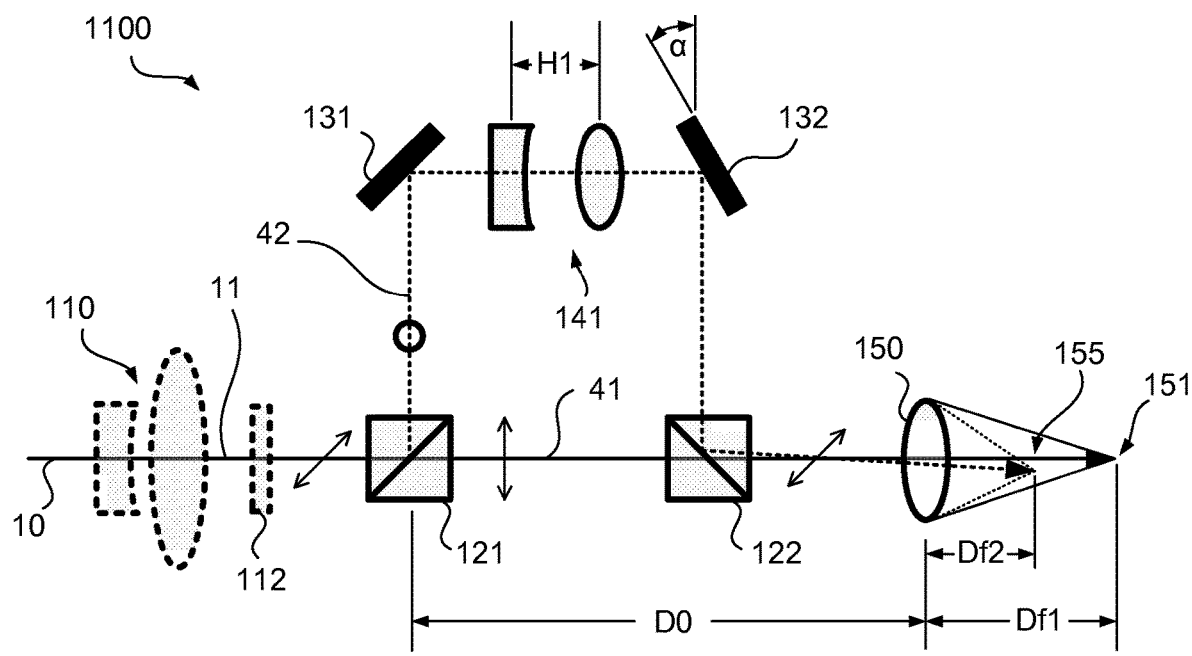
FIG. 11 is a schematic plan view of an exemplary optical arrangement for forming laser beams with multiple foci that are off-axis from one another according to an embodiment of the disclosure.

FIG. 11 illustrates a further non-limiting embodiment of an exemplary optical arrangement 1100 including two foci configured to be at different depths (i.e., locations in the surface of a transparent article), but also are off-axis from one another. The optical arrangement 1100 includes two separate optical trains that include a series of lenses, beam splitters, and mirrors used to separate the beam multiple times, and later recombine them, but slightly off-axis to one another. Once the initial laser beam 10 is a split into two portions, a focus of at least one of the two portions may be changed in accordance with Equations 1-4, described above. Thus, when the first and second portions of the initial laser beam are brought back together, they will have different foci. In addition, by modifying an angle of one of the portions, that portion's focus will not be axially aligned with the other portion (i.e., off-axis).

The optical arrangement 1100 may optionally include all the same elements described above with regard to optical arrangement 100 (FIG. 1), but may be different in that it generates a first laser beam 41 and a second laser beam 42 that are off-axis from one another. The first laser beam 41 still includes a first focus point 151 disposed a first focus distance Df1 from the focusing lens 150, and the second laser beam 42 still includes a second focus point 155 disposed a second focus distance Df2 from the same mutual focusing lens 150. However, in addition to the first focus distance Df1 being different than the second focus distance Df2, the second focus point 155 lies laterally offset from the axis of the first laser beam 41. In this way, the different foci of the first and second laser beams 41, 42 are off-axis from one another and may be configured to coincide with different depths inside a transparent material being processed, such as a transparent article.

The optical arrangement 1100 may achieve the off-axis configuration by repositioning the second mirror 132 at an angle α slightly more or less than 45°. This angular change of the second mirror 132 causes the second laser beam 42 to enter the second polarizing beam splitter 122 at a different angle (e.g., non-orthogonal to the first laser beam 41) which redirects the second laser beam 42 in a similar direction as the first laser beam 41 but along a slightly off-axis. In this way, while the first laser beam 41 and a second laser beam 42 are made to converge at the second polarizing beam splitter 122, their off axis configuration causes the two beams to diverge after exiting the second polarizing beam splitter 122. Thus, the first and second laser beams 41, 42 are not precisely collinearly converged as in other exemplary embodiments.

In yet further exemplary embodiments, the optical arrangement 1100 may achieve the off-axis configuration by positioning the second mirror 132 at a 45° angle, but slightly misaligned with the second polarizing beam splitter 122 so that the second laser beam 42 is redirected parallel to but slightly offset from the first laser beam 41. Alternatively, rotating the first mirror 131 slightly or tilting the polarizing beam splitter 121 may achieve the same desirable off-axis performance.

Alternatively, one or more wave-plates may be included in one or more parts of the optical train to selectively vary the amount of power directed into the respective optical trains, or change the focus points 151, 155 generally. For example, a wave-plate 112 may be used before the adjusted laser beam 11 enters the first polarizing beam splitter 121 to control a power ratio between the first and second laser beams 41, 42.

Figure 12A:
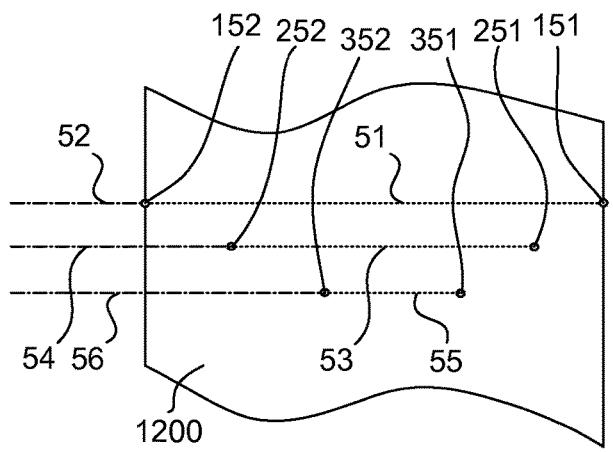
FIG. 12A is a schematic cross-sectional side view of variable scribe lines used to form a U-shaped edge in an exemplary transparent article according to an embodiment of the disclosure.

FIG. 12A illustrates a non-limiting embodiment of three off-axis pairs of multi-foci laser beams processing a transparent article 1200. A first pair of laser beams includes a first laser beam 51 and a second laser beam 52. The first and second laser beams 51, 52 may be collinearly converged with one another, but having offset foci. For example, the first laser beam 51 includes a first focus point 151 and the second laser beam 52 includes a second focus point 152 offset from the first focus point 151, wherein the first and second focus points 151, 152 line the same axis.

In addition, a second pair of laser beams includes a third laser beam 53 and a fourth laser beam 54. The third and fourth laser beams 53, 54 may be collinearly converged with one another, but having offset foci. For example, the third laser beam 53 includes a third focus point 251 and the fourth laser beam 54 includes a fourth focus 252 offset from the third focus point 251, wherein the third and fourth focus points 251, 252 line the same axis.

Similarly, a third pair of laser beams includes a fifth laser beam 55 and a sixth laser beam 56. The fifth and sixth laser beams 55, 56 may be collinearly converged with one another, but having offset foci. For example, the fifth laser beam 55 includes a fifth focus point 351 and the sixth laser beam 56 includes a sixth focus 352 offset from the first focus point 351, wherein the fifth and sixth focus points 351, 352 line the same axis.

By focusing the three pairs of laser beams 51, 52; 53, 54; and 55, 56 on the transparent article 1200, flaws may be generated in the locations that coincide with the focus points 151, 152, 251, 252, 351, 352. In at least certain embodiments, it may be desirable to use lower levels of laser power, when creating scribe lines for non-linear cuts to avoid cracking or flaw propagation that deviates substantially from the intended cut-path.

The three pairs of laser beams 51, 52; 53, 54; and 55, 56 need not be generated simultaneously. Each of the three pairs may be formed by a single initial laser beam that is split into two portions. As such, the first and second laser beams may be the same laser beams having multiple passes, such that the third laser beam corresponds to the first laser beam and the fourth laser beam corresponds to the second laser beam, etc. Thus, with three passes on the transparent article 1200 laterally offset from one another, the six different focus points 151, 152, 251, 252, 351, 352 may be directed at the transparent article 1200.

Alternatively, the three pairs of laser beams 51, 52; 53, 54; and 55, 56 may be formed by a single initial laser beam that is split into six portions. This may be done, for example, similar to the way the exemplary optical arrangement 200 (FIG. 2) split a laser beam into four portions, but adding two additional polarizing beam splitters to the configuration of the exemplary optical arrangement 200 to split the laser beam into six portions. In addition, individual pairs of the three pairs of laser beams 51, 52; 53, 54; and 55, 56 may be directed to follow separate optical trains that do not need to intersect or converge at a final common polarizing beam splitter. As a further exemplary embodiment, using the off-axis configuration of the optical arrangement 1100, the six different focus points 151, 152, 251, 252, 351, 352, having various lateral positions and each having a different depth may be achieved.

Figure 12B:
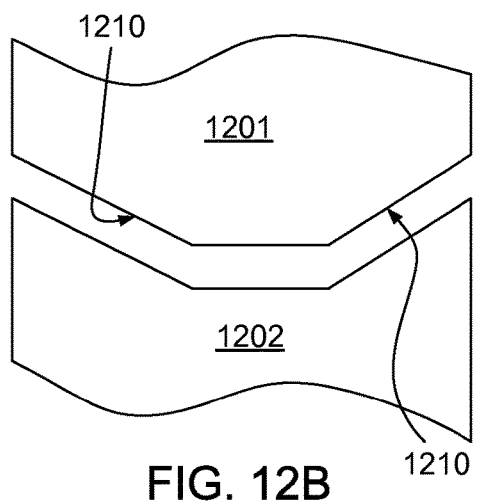
FIG. 12B is a schematic cross-sectional side view of the exemplary transparent article of FIG. 12A separated along the variable scribe lines to form the U-shaped edge according to an embodiment of the disclosure.

FIG. 12B illustrates a first glass portion 1201 and a second transparent article portion 1202 formed by separating the transparent article 1200 shown in FIG. 12A along a scribe line following the flaws created by the focus points (i.e., 151, 152, 251, 252, 351, 352) in a connect-the-dots fashion. The separation of the first and second glass portions 1201, 1202 creates a U-shaped edge 1210 rather than a simple straight cut edge. The U-shaped edge 1210 is an example of non-planar surface that may be formed in accordance with various embodiments herein.

Figures 13A, 13B, 13C, 13D:
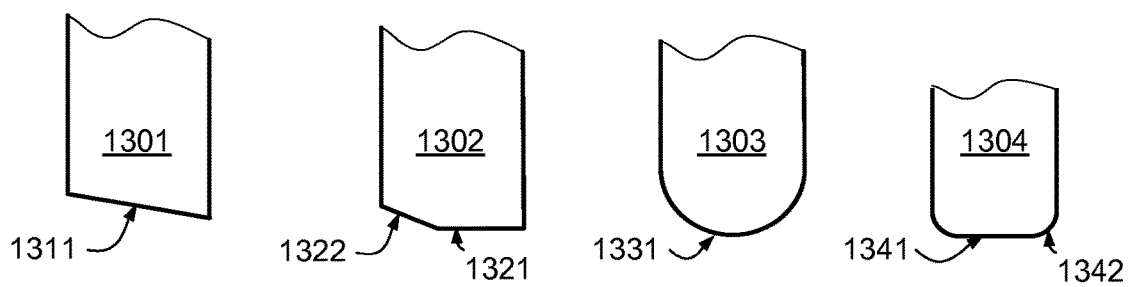
FIG. 13A-13D are schematic cross-sectional side views of different transparent article edge shapes formed according to embodiments of the disclosure.

FIGS. 13A-13D illustrate several exemplary edge shapes that may be achieved by various methods of processing glass in accordance with exemplary embodiments described herein. For example, FIG. 13A illustrates a transparent article 1301 including an angled edge cut 1311 that may be achieved using an optical arrangement having features of one of the embodiments or combinations thereof. The angled edge cut 1311 may optionally be achieved using the collinearly converged multi-foci optical arrangements 100, 200 (FIGS. 1, 2) aimed at the transparent article 1301 on a slight angle matching the angle of the angled edge cut 1311. Alternatively, the angled edge cut 1311 may be achieved using the off-axis multi-foci optical arrangement 1100 (FIG. 11).

FIG. 13B illustrates a transparent article 1302 including a straight edge 1321 with a truncated corner 1322. FIG. 13C illustrates a transparent article 1302 including a rounded (i.e., bull nose) edge cut 1331. FIG. 13D illustrates a transparent article 1304 including a straight edge 1341 with rounded corners 1342.

The systems and methods disclosed herein may be used to shape transparent articles having various thicknesses. The techniques and particular optical arrangements disclosed herein may be used to generate laser beams having different and varied foci. In addition, a separation between foci may be varied and/or changed in accordance with various embodiments. Further, a balance of power between the plurality of laser beams separated from an initial laser beam may be selectively modified to alter the size of one or more flaws being generated within the transparent article. The various embodiments produce multiple laser beams from a single initial laser beam, where the multiple laser beams are directionally independent of one another. The various embodiments may increase processing speeds of cutting transparent articles by reducing the number of passes in forming score lines for separating the transparent articles. Further still, the various embodiments may be used to achieve cut glass edge shapes that are non-linear and/or include a unique customized shape.

Figure 14:
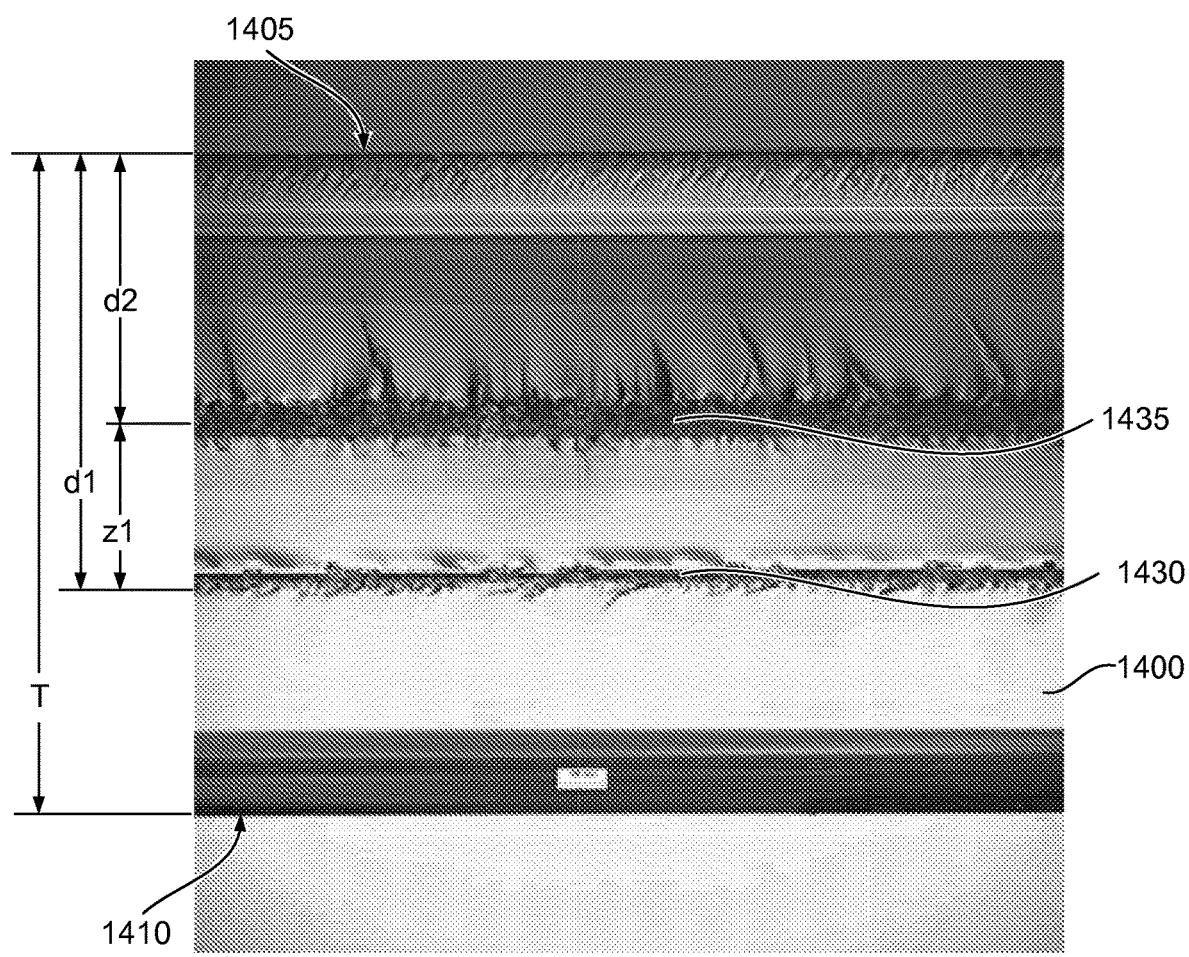
FIG. 14 is a side elevation image of a cut edge from an exemplary transparent article with multiple scribe lines according to an embodiment of the disclosure.

FIG. 14 illustrates an image of a cut edge of an exemplary laminate transparent article 1400 processed by an exemplary optical arrangement according to non-limiting embodiments of the disclosure. The transparent article 1400 includes a top surface 1405 (i.e., a first outer surface), a bottom surface 1410 (i.e., a second outer surface), and the cut edge extending a full thickness T between the top surface 1405 and the bottom surface 1410. The cut edge is a planar surface formed by two scribe lines 1430, 1435, disposed on a mutual plane with the planar surface of the cut edge. The two scribe lines 1430, 1435 were formed with a single pass using the optical arrangement 100 (FIG. 1). The two scribe lines 1430, 1435 reflect damage from a first and second laser beam collinearly combined with multiple foci. A first focus point from a first laser beam created the first scribe line 1430 from a consecutive and continuous series of flaws as a horizontal line a first distance d1 below the top surface 1405. A second focus point from a second laser beam created the second scribe line 1435 from a consecutive and continuous series of flaws as a horizontal line a second distance d2 below the top surface 1405. In addition, the first and second scribe lines 1430, 1435 are offset from one another by a distance z1. The first and second scribe lines 1430, 1435 were used to form the cut edge of the transparent article 1400 by separating the transparent article 1400 from a removed article integrally formed with the transparent article 1400 before being separated. In accordance with various embodiments, a minimum spacing between the first and second scribe lines is at least 10% of the full thickness T, for example about 25% of the full thickness T as illustrates in FIG. 14, which was effective to separate the transparent article 1400.

The edge attributes of a processed transparent article in accordance with various embodiments herein are different from existing glass processing techniques. In particular, at least two scribe lines may be formed inside a transparent article with a spacing between them that is equal to or greater than 10% of the thickness of the transparent article. This enables fewer scribe lines to be formed, while still providing effective separation of the transparent article. In this way, the transparent article may be separated without requiring an overlap in scribe lines and a further separation between scribe lines as compared to contemporary techniques. In this way, a total area of scribe lines, along what will become the cut edge of glass, may be less than 70% of the edge area, or preferably <60% of the edge area, or more preferably <50% of the edge area. In addition, for a non-flat edge (i.e., bull-nose or chamfered edges) a cut edge may be achieved using fewer scribe lines than existing glass processing techniques. The scribe lines formed in accordance with various embodiments herein induce stress inside the transparent article before separation. The accumulation of stress can be sufficient to propagate cracks to the adjacent scribe lines and eventually separate the transparent article. Thus, the scribe lines formed in accordance with various embodiments may form cut edges with desirable profiles much faster and with fewer scribe lines than contemporary techniques.

Non-limiting exemplary transparent articles include, but are not limited to, a single sheet of glass, multiple sheets of glass in a single stack, glass-glass laminate structures, and glass-polymer laminate structures.

It will be appreciated that the various disclosed embodiments may involve particular features, elements, or steps that are described in connection with that particular embodiment. It will also be appreciated that any one of those particular features, elements, or steps, although described in relation to one particular embodiment, may be interchanged or combined with alternate embodiments in various non-illustrated combinations or permutations. For example, the two foci that are off-axis described in association with FIG. 11 may be incorporated into the four-foci arrangement described in association with FIG. 2, making one or more foci off-axis from the others.

It is also to be understood that, as used herein the terms "the," "a," or "an," mean "at least one," and should not be limited to "only one" unless explicitly indicated to the contrary. Likewise, a "plurality" is intended to denote "more than one." As such, a "plurality of laser beams" includes two or more laser beams, etc.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially straight" edge is intended to denote an edge that is straight or approximately straight. Moreover, as defined above, "substantially similar" is intended to denote that two values are equal or approximately equal.

Unless otherwise expressly stated, it is in no way intended that any method set forth herein be construed as requiring that its steps be performed in a specific order. Accordingly, where a method, including a method claim, does not actually recite an order to be followed by its steps or it is not otherwise specifically stated as following an order or describes that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a system that comprises A+B+C include embodiments where a system consists of A+B+C and embodiments where a system consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A method for processing a transparent article comprising:
collinearly converging a first laser beam and a second laser beam along a mutual path, a first focus point of the first laser beam and a second focus point of the second laser beam offset from one another along the mutual path;
moving the collinearly converged first and second laser beams along the mutual path in a first pass across at least a portion of a surface of a transparent article to form a first series of flaws in the transparent article at a first depth from the surface of the transparent article corresponding to the first focus point and a second depth from the surface of the transparent article corresponding to the second focus point;
adjusting at least one of the first focus point and the second focus point; and
moving the collinearly converged first and second laser beams along the mutual path in a second pass across the portion of the surface of the transparent article that overlaps the first pass to form a second series of flaws in the transparent article at a third depth from the surface of the transparent article corresponding to the first focus point and a fourth depth from the surface of the transparent article corresponding to the second focus point, the first series of flaws interleaved with the second series of flaws,
wherein at least one of the first series of flaws is disposed closer to the surface than at least one of the second series of flaws.

2. The method of claim 1, further comprising a step of separating the transparent article along the first and second series of flaws.

3. The method of claim 1, wherein the second laser beam passes through at least two lenses prior to collinearly converging with the first laser beam, and adjusting the first and second focus points comprises adjusting a distance between the at least two lenses.

4. The method of claim 1, further comprising:
generating with a laser an initial laser beam configured to project along a first path;
splitting the initial laser beam using a polarizing beam splitter disposed in the first path and configured to direct the first laser beam along the first path and the second laser beam along a second path divergent from the first path.

5. The method of claim 4, further comprising adjusting a polarization angle of the initial laser beam, whereby a power output of at least one of the first and second laser beams is altered in response to the adjusting the polarization angle of the initial laser beam.

6. The method of claim 5, wherein an average power of the first and second laser beams is closer to being equal as a result of the adjusting of the polarization angle of the initial laser beam.

7. The method of claim 1, wherein at least one of the third depth and the fourth depth is farther from the surface than the first depth.

8. A method for processing a transparent article comprising:
generating with a laser an initial laser beam configured to project along a first path;
splitting the initial laser beam using a polarizing beam splitter disposed in the first path to direct a first laser beam along the first path and a second laser beam along a second path divergent from the first path, the first laser beam having a first focus point along the first path and the second laser beam having a second focus point along the second path;
passing the first and second laser beams through a mutual focusing lens to focus the first and second laser beams on a transparent article;
moving the first and second laser beams across the transparent article in a first pass to form a first and second series of flaws in the transparent article, the first series of flaws at a first lateral position and a first depth from a surface of the transparent article, the second series of flaws at a second lateral position offset from the first lateral position and a second depth from the surface of the transparent article offset from the first depth, the first lateral position and the first depth corresponding to the first focus point, and the second lateral position and the second depth corresponding to the second focus point; and
moving the first and second laser beams across the transparent article in a second pass that overlaps the first pass to form a third and fourth series of flaws in the transparent article, the third series of flaws at a third lateral position and a third depth from the surface of the transparent article, the fourth series of flaws at a fourth lateral position offset from the third lateral position and a fourth depth from the surface of the transparent article offset from the third depth, the third lateral position and the third depth corresponding to the first focus point, and the fourth lateral position and the fourth depth corresponding to the second focus point, wherein at least one of the third series of flaws and the fourth series of flaws is disposed closer to the surface than one of the first series of flaws and the second series of flaws.

9. The method of claim 8, further comprising a step of separating the transparent article along the first, second, third, and fourth series of flaws.

10. The method of claim 8, wherein one of the first path and the second path are collinear with the initial laser beam.

11. The method of claim 8, further comprising adjusting a distance between at least two first lenses to adjust a position of the second focus point along the second path.

12. The method of claim 8, further comprising adjusting a polarization angle of the initial laser beam to adjust a power output of at least one of the first and second laser beams.

13. The method of claim 8, further comprising adjusting an angle of a mirror to adjust a distance between the first lateral position and the second lateral position.

UNITED STATES PATENT AND TRADEMARK OFFICE
CERTIFICATE OF CORRECTION

| | | |
|---|---|---|
| PATENT NO. | : 10,843,956 B2 | |
| APPLICATION NO. | : 15/525383 | |
| DATED | : November 24, 2020 | |
| INVENTOR(S) | : Anping Liu et al. | |

It is certified that error appears in the above-identified patent and that said Letters Patent is hereby corrected as shown below:

On the Title Page

Page 2, Column 2, item [56], Other Publications, Line 1, delete "Aciton" and insert -- Action --, therefor.

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*